US011262978B1

(12) United States Patent
Cohen et al.

(10) Patent No.: US 11,262,978 B1
(45) Date of Patent: Mar. 1, 2022

(54) VOICE-ADAPTED REFORMULATION OF WEB-BASED ANSWERS

(71) Applicant: Amazon Technologies, Inc., Seattle, WA (US)

(72) Inventors: Nachshon Cohen, Haifa (IL); David Carmel, Haifa (IL); Simone Filice, Seattle, WA (US); Elad Kravi, Atlit (IL); Liane Lewin-Eytan, Binyamina (IL); Vitaly Mirkis, Hadera (IL); Sofia Tolmach, Haifa (IL)

(73) Assignee: Amazon Technologies, Inc., Seattle, WA (US)

( * ) Notice: Subject to any disclaimer, the term of this patent is extended or adjusted under 35 U.S.C. 154(b) by 329 days.

(21) Appl. No.: 16/446,080

(22) Filed: Jun. 19, 2019

(51) Int. Cl.
*G06F 3/0482* (2013.01)
*G06F 3/16* (2006.01)
*G06F 16/907* (2019.01)
*G06F 16/9038* (2019.01)
*G06N 3/08* (2006.01)
*G06F 16/9032* (2019.01)
*G06F 16/903* (2019.01)
(Continued)

(52) U.S. Cl.
CPC ............ *G06F 3/167* (2013.01); *G06F 3/0482* (2013.01); *G06F 16/907* (2019.01); *G06F 16/9038* (2019.01); *G06N 3/08* (2013.01); *G06F 16/90332* (2019.01); *G06F 16/90344* (2019.01); *G06F 16/9532* (2019.01); *G06N 20/10* (2019.01)

(58) Field of Classification Search
None
See application file for complete search history.

(56) References Cited

U.S. PATENT DOCUMENTS

| 7,158,618 B1 * | 1/2007 | Kusuda | H04M 1/2478 370/356 |
| 8,566,102 B1 * | 10/2013 | Bangalore | G10L 15/22 704/270.1 |

(Continued)

OTHER PUBLICATIONS

Agichtein et al., "Overview of the TREC 2016 LiveQA Track", Available online at: https://trec.nist.gov/pubs/trec25/papers/Overview-QA.pdf, 2016, 9 pages.

(Continued)

*Primary Examiner* — Jordany Nunez
(74) *Attorney, Agent, or Firm* — Kilpatrick Townsend & Stockton LLP

(57) ABSTRACT

Techniques are disclosed. The techniques include receiving, by a computing device, an answer to a query, the answer comprising a content element and a metadata element. Based on the content element and the metadata element, the techniques generate a presentable sentence of a plurality of presentable sentences. The techniques then utilize a machine learning model to determine a relevance score for the presentable sentence based on the query and the presentable sentence, the relevance score being of a set of relevance scores and corresponding to a measure of relevance with respect to the presentable sentence answering the query. The techniques then select a portion of the plurality of presentable sentences based on a ranking of the set of relevance scores and transmit the portion to a user device for presentation on a voice-based interface of the user device.

20 Claims, 8 Drawing Sheets

(51) Int. Cl.
  *G06N 20/10* (2019.01)
  *G06F 16/9532* (2019.01)

(56) References Cited

U.S. PATENT DOCUMENTS

| | | | | |
|---|---|---|---|---|
| 8,989,713 | B2* | 3/2015 | Doulton | H04M 3/533 |
| | | | | 455/414.1 |
| 9,697,477 | B2* | 7/2017 | Oh | G06N 20/00 |
| 10,186,267 | B1* | 1/2019 | Devaraj | H04L 67/303 |
| 10,200,824 | B2* | 2/2019 | Gross | H04W 4/40 |
| 10,282,469 | B2* | 5/2019 | Mani | G06F 16/345 |
| 10,360,265 | B1* | 7/2019 | Agarwal | G06F 16/90332 |
| 10,489,393 | B1* | 11/2019 | Mittal | G06F 16/243 |
| 10,496,928 | B2* | 12/2019 | Oh | G06N 5/041 |
| 10,628,472 | B2* | 4/2020 | Byron | G06F 16/9535 |
| 10,684,703 | B2* | 6/2020 | Hindi | G06F 3/0414 |
| 10,762,892 | B2* | 9/2020 | Rusak | G06N 20/00 |
| 10,839,159 | B2* | 11/2020 | Yang | G06N 5/022 |
| 10,877,632 | B2* | 12/2020 | Sarin | G06F 3/0482 |
| 10,909,331 | B2* | 2/2021 | Peitz | G10L 15/16 |
| 2003/0023443 | A1* | 1/2003 | Shizuka | G10L 13/00 |
| | | | | 704/260 |
| 2004/0225667 | A1* | 11/2004 | Hu | G06F 16/345 |
| 2007/0255702 | A1* | 11/2007 | Orme | G06F 16/338 |
| 2008/0319735 | A1* | 12/2008 | Kambhatla | G06F 40/30 |
| | | | | 704/9 |
| 2009/0019060 | A1* | 1/2009 | Beckerman | G06Q 50/20 |
| 2012/0215640 | A1* | 8/2012 | Ramer | G06Q 30/0269 |
| | | | | 705/14.55 |
| 2013/0111348 | A1* | 5/2013 | Gruber | G06F 40/279 |
| | | | | 715/727 |
| 2013/0185074 | A1* | 7/2013 | Gruber | G10L 15/1815 |
| | | | | 704/257 |
| 2013/0275875 | A1* | 10/2013 | Gruber | H04L 67/12 |
| | | | | 715/728 |
| 2015/0012271 | A1* | 1/2015 | Peng | G10L 15/08 |
| | | | | 704/235 |
| 2015/0026106 | A1* | 1/2015 | Oh | G06F 16/3329 |
| | | | | 706/12 |
| 2015/0279390 | A1* | 10/2015 | Mani | G10L 25/48 |
| | | | | 704/235 |
| 2016/0132590 | A1* | 5/2016 | Byron | G06F 16/3329 |
| | | | | 707/734 |
| 2016/0155058 | A1* | 6/2016 | Oh | G06N 5/041 |
| | | | | 706/11 |
| 2016/0171094 | A1* | 6/2016 | Byron | G06F 16/3344 |
| | | | | 707/734 |
| 2016/0350406 | A1* | 12/2016 | Byron | G06F 16/3344 |
| 2016/0360336 | A1* | 12/2016 | Gross | H04M 1/72403 |
| 2017/0161372 | A1* | 6/2017 | Fernández | G06F 40/268 |
| 2017/0228372 | A1* | 8/2017 | Moreno | G06F 16/3329 |
| 2017/0323009 | A1* | 11/2017 | Byron | G06F 16/9535 |
| 2018/0068222 | A1* | 3/2018 | Brennan | G06N 5/022 |
| 2018/0225271 | A1* | 8/2018 | Bellamy | A61B 5/165 |
| 2018/0341871 | A1* | 11/2018 | Maitra | G06N 3/0427 |
| 2019/0103092 | A1* | 4/2019 | Rusak | G06F 40/35 |
| 2019/0116144 | A1* | 4/2019 | Ghotbi | G06N 5/02 |
| 2019/0158994 | A1* | 5/2019 | Gross | H04M 1/72403 |
| 2019/0340503 | A1* | 11/2019 | Cheng | G06Q 30/0625 |
| 2019/0361980 | A1* | 11/2019 | Biesterfeld | G06F 40/40 |
| 2019/0369748 | A1* | 12/2019 | Hindi | G10L 15/22 |
| 2020/0084166 | A1* | 3/2020 | Ghotbi | H04L 51/063 |
| 2020/0304955 | A1* | 9/2020 | Gross | G06F 3/04186 |
| 2020/0304972 | A1* | 9/2020 | Gross | G06F 3/0482 |
| 2020/0357406 | A1* | 11/2020 | York | G10L 15/1815 |
| 2020/0380389 | A1* | 12/2020 | Eldeeb | G06N 20/00 |
| 2020/0380963 | A1* | 12/2020 | Chappidi | G06F 40/30 |
| 2021/0209566 | A1* | 7/2021 | Ketharaju | G06Q 20/36 |

OTHER PUBLICATIONS

BURGES, "From RankNet to LambdaRank to LambdaMART: An Overview", Microsoft Research Technical Report MSR-TR-2010-82, Available online at: http://research.microsoft.com/en-us/um/people/cburges/tech_reports/MSR-TR-2010-82.pdf, Jun. 2010, 19 pages.

Cer et al., "Universal Sentence Encoder", Available online at: https://arxiv.org/pdf/1803.11175.pdf, Apr. 12, 2018, 7 pages.

Chali et al., "Query-Focused Multidocument Summarization: Automatic Data Annotations and Supervised Learning Approaches", Natural Language Engineering, vol. 18, No. 1, Available online at: https://doi.org/10.1017/S1351324911000167, Jan. 2012, pp. 109-145.

Da San Martino et al., "Learning to Re-Rank Questions in Community Question Answering Using Advanced Features", Proceedings of the 25th ACM International on Conference on Information and Knowledge Management, Available online at: https://doi.org/10.1145/2983323.2983893, Oct. 24-28, 2016, pp. 1997-2000.

Dang, "Overview of DUC 2006", Available online at: https://duc.nist.gov/pubs/2006papers/duc2006.pdf, Jan. 2006, 10 pages.

Daume III et al., "Bayesian Query-Focused Summarization", Proceedings of the 21st International Conference on Computational Linguistics and 44th Annual Meeting of the Association for Computational Linguistics, Available online at: http://arxiv.org/abs/0907.1814, Jul. 10, 2009, 8 pages.

Devlin et al., "BERT: Pre-Training of Deep Bidirectional Transformers for Language Understanding", Available online at: https://arxiv.org/pdf/1810.04805.pdf, May 24, 2019, 16 pages.

Dos Santos et al., "Learning Hybrid Representations to Retrieve Semantically Equivalent Questions", Proceedings of the 53rd Annual Meeting of the Association for Computational Linguistics and the 7th International Joint Conference on Natural Language Processing, Available online at: https://doi.org/10.3115/v1/P15-2114, Jul. 26-31, 2015, pp. 694-699.

Duan et al., "Searching Questions by Identifying Question Topic and Question Focus", Proceedings of the 46th Annual Meeting of the Association for Computational Linguistics, Available online at: http://www.aclweb.org/anthology/P08-1019, Jun. 15-20, 2008, pp. 156-164.

Dusek et al., "Findings of the E2E NLG Challenge", Proceedings of the 11th International Conference on Natural Language Generation, Available online at: https://arxiv.org/pdf/1810.01170.pdf, Oct. 2, 2018, 7 pages.

Filice et al., "KeLP at SemEval-2017 Task 3: Learning Pairwise Patterns in Community Question Answering", Proceedings of the 11th International Workshop on Semantic Evaluations, Available online at: https://doi.org/10.3233/IA-170034, Aug. 3-4, 2017, pp. 326-333.

Gambhir et al., "Recent Automatic Text Summarization Techniques: A Survey", Artificial Intelligence Review, vol. 47, No. 1, Available online at: https://doi.org/10.1007/s10462-016-9475-9, Jan. 2017, pp. 1-66.

Gatt et al., "Survey of the State of the Art in Natural Language Generation: Core Tasks, Applications and Evaluation", Journal of Artificial Intelligence Research, vol. 61, No. 1, Available online at: https://doi.org/10.1613/jair.5477, Jan. 2018, pp. 65-170.

Guzman et al., "Machine Translation Evaluation with Neural Networks", Available online at https://arxiv.org/pdf/1710.02095.pdf, Oct. 5, 2017, 45 pages.

Mihalcea et al., "TextRank: Bringing Order into Texts", Proceedings of the Conference on Empirical Methods in Natural Language Processing, Available online at: http://www.aclweb.org/anthology/W04-3252, Jul. 2004, pp. 404-411.

Nakov et al., "SemEval-2015 Task 3: Answer Selection in Community Question Answering", Proceedings of the 9th International Workshop on Semantic Evaluation, Available online at: http://www.aclweb.org/anthology/S15-2047, Jun. 4-5, 2015, pp. 269-281.

Nakov et al., "SemEval-2016 Task 3: Community Question Answering", Proceedings of the 10th International Workshop on Semantic Evaluation, Jun. 16-17, 2016, pp. 525-545.

Nakov et al., "SemEval-2017 Task 3: Community Question Answering", Proceedings of the 11th International Workshop on Semantic Evaluations, Aug. 3-4, 2017, pp. 27-48.

Nallapati et al., "Abstractive Text Summarization using Sequence-to-sequence RNNs and Beyond", Proceedings of the 20th SIGNLL

(56) References Cited

OTHER PUBLICATIONS

Conference on Computational Natural Language Learning, Available online at: http://aclweb.org/anthology/K/K16/K16-1028.pdf, Aug. 7-12, 2016, pp. 280-290.

Nenkova et al., "A Survey of Text Summarization Techniques", Mining Text Data, Available online at: http://dblp.uni-trier.de/db/books/collections/Mining2012.html#NenkovaM12, Jan. 2012, pp. 43-76.

Pande et al., "Summarizing Answers for Community Question Answer Services", The International Conference of the German Society for Computational Linguistics and Language Technology, Available online at: https://doi.org/10.1007/978-3-642-40722-2_16, Sep. 2013, pp. 151-161.

Pennington et al., "GloVe: Global Vectors for Word Representation", Proceedings of the Conference on Empirical Methods in Natural Language Processing, Oct. 25-29, 2014, pp. 1532-1543.

Rajpurkar et al., "SQuAD: 100,000+ Questions for Machine Comprehension of Text", Proceedings of the Conference on Empirical Methods in Natural Language Processing, Available online at: https://doi.org/10.18653/v1/D16-1264, Nov. 1-5, 2016, pp. 2383-2392.

See et al., "Get to the Point: Summarization with Pointer-Generator Networks", Available online at: https://arxiv.org/pdf/1704.04368.pdf, Apr. 25, 2017, 20 pages.

Severyn et al., "Learning to Rank Short Text Pairs with Convolutional Deep Neural Networks", Proceedings of the 38th International ACM SIGIR Conference on Research and Development in Information Retrieval, Available online at: https://doi.org/10.1145/2766462.2767738, Aug. 9-13, 2015, pp. 373-382.

Shtok et al., "Learning from the Past: Answering New Questions with Past Answers", Proceedings of the 21st International Conference on World Wide Web, Apr. 16-20, 2012, pp. 759-768.

Song et al., "Summarizing Answers in Non-Factoid Community Question-Answering", Proceedings of the Tenth ACM International Conference on Web Search and Data Mining, Available online at: http://dl.acm.org/citation.cfm?id=3018704, Feb. 6-10, 2017, pp. 405-414.

Tan et al., "LSTM-Based Deep Learning Models for Non-Factoid Answer Selection", Available online at: https://arxiv.org/pdf/1511.04108.pdf, Mar. 28, 2016, 11 pages.

Tan et al., "Multiway Attention Networks for Modeling Sentence Pairs", Proceedings of the Twenty-Seventh International Joint Conference on Artificial Intelligence, Available online at: https://doi.org/10.24963/ijcai.2018/613, Jul. 13-19, 2018, pp. 4411-4417.

Tomasoni et al., "Metadata-Aware Measures for Answer Summarization in Community Question Answering", Proceedings of the 48th Annual Meeting of the Association for Computational Linguistics, Available online at: http://www.aclweb.org/anthology/P10-1078, Jul. 11-16, 2010, pp. 760-769.

Wu et al., "Google's Neural Machine Translation System: Bridging the Gap between Human and Machine Translation", Available online at: https://arxiv.org/pdf/1609.08144.pdf, Oct. 8, 2016, 23 pages.

Xue et al., "Retrieval Models for Question and Answer Archives", Proceedings of the 31st Annual International ACM SIGIR Conference on Research and Development in Information Retrieval, Jul. 20-24, 2008, pp. 475-482.

* cited by examiner

```
<div class="post-text" itemprop="text">

<p> There are many ways to paint a house (some methods are better than others). While
the list below provides a summary, you can find a more detailed description at <a
href="https://www.example.com/watch?v=Kjxc57o-q8w" rel="nofollow">https://
www.example.com/watch?v=Kjxc57o-q8w</a>.</p>

<p> Here are a few steps: </p>

<ol>
<li><p>Clean the surface of the house. <img ... cleaning.jpg...></p></li>
<li><p>Remove defective paint.</p></li>
<li><p>Choose your paint.</p></li>
<li><p>Paint the sidings.</p></li>
<li><p>Paint the trim.</p></li>
</ol>

<p>Although it may be time-consuming =(, by performing the steps correctly, you will
prolong the time until your house needs to be painted again and make the investment
worthwhile. Also, don't forget to choose the right time of the year, as extreme
temperatures can ruin a paint job!</p>

</div>
```

400

402

```
<p> There are many ways to paint a house. While the list below provides a summary,
you can find a more detailed description at a website.</p>

<p> Here are a few steps: </p>

<ol>
<li><p>Clean the surface of the house. </p></li>
...
</ol>

<p>Although it may be time-consuming, by performing the steps correctly, you will
prolong the time until your house needs to be painted again and make the investment
worthwhile. Also, don't forget to choose the right time of the year, as extreme
temperatures can ruin a paint job!</p>
```

404

1) There are many ways to paint a house.
2) While the list below provides a summary, you can find a more detailed description at a website.
3) Here are a few steps: First, clean the surface of the house. Second, remove defective paint. Third, choose your paint. Fourth, paint the sidings. Fifth, paint the trim.
4) Although it may be time-consuming, by performing the steps correctly, you will prolong the time until your house needs to be painted again and make the investment worthwhile.
5) Also, don't forget to choose the right time of the year, as extreme temperatures can ruin a paint job!

(a)
Question: How do you paint a house?

Answer:
1) There are many ways to paint a house.
2) While the list below provides a summary, you can find a more detailed description at a website.
3) Here are a few steps: First, clean the surface of the house. Second, remove defective paint. Third, choose your paint. Fourth, paint the sidings. Fifth, paint the trim.
4) Although it may be time-consuming, by performing the steps correctly, you will prolong the time until your house needs to be painted again and make the investment worthwhile.
5) Also, don't forget to choose the right time of the year, as extreme temperatures can ruin a paint job!

604

(b)
Select the sentence that individually best answers the question:
☐ There are many ways to paint a house.
☐ While the list below provides a summary, you can find a more detailed description at a website.
☒ Here are a few steps: First, clean the surface of the house. Second, remove defective paint. Third, choose your paint. Fourth, paint the sidings. Fifth, paint the trim.
☐ Although it may be time-consuming, by performing the steps correctly, you will prolong the time until your house needs to be painted again and make the investment worthwhile.
☐ Also, don't forget to choose the right time of the year, as extreme temperatures can ruin a paint job!

606

(c)
Does the best sentence you selected answer the question clearly and independently of other sentences?
☒ Yes
☐ No

608

(d)
Mark all the sentences (the fewer the better) that should appear in a very concise and direct answer to the question:
☐ There are many ways to paint a house.
☐ While the list below provides a summary, you can find a more detailed description at a website.
☒ Here are a few steps: First, clean the surface of the house. Second, remove defective paint. Third, choose your paint. Fourth, paint the sidings. Fifth, paint the trim.
☐ Although it may be time-consuming, by performing the steps correctly, you will prolong the time until your house needs to be painted again and make the investment worthwhile.
☒ Also, don't forget to choose the right time of the year, as extreme temperatures can ruin a paint job!

FIG. 6

VOICE-ADAPTED REFORMULATION OF WEB-BASED ANSWERS

BACKGROUND

As voice recognition technology improves, systems that employ such technology continue to proliferate. Some systems employ what is referred to as near-field voice recognition where a user speaks into a microphone located on a hand held device, such as a remote control or mobile device. Other systems employ far-field voice recognition where a user can speak to a device while the user is within the general vicinity of the device, e.g., within the same room, but not necessarily in close proximity to or even facing the device.

Such devices may be referred to as voice-based user devices. A voice-based user device generally provides the user with a voice-based interface to access various services. The voice-based user device may be limited to voice as the input and/or output modality.

BRIEF DESCRIPTION OF THE DRAWINGS

Various embodiments in accordance with the present disclosure will be described with reference to the drawings, in which:

FIG. 4 illustrates an example data transformation flow performed by a computer system during an interaction session, in accordance with various embodiments;

FIG. 6 illustrates an example training data for training a machine learning model of a computer system to support an interaction session, in accordance with various embodiments;

DETAILED DESCRIPTION

Figure 1:
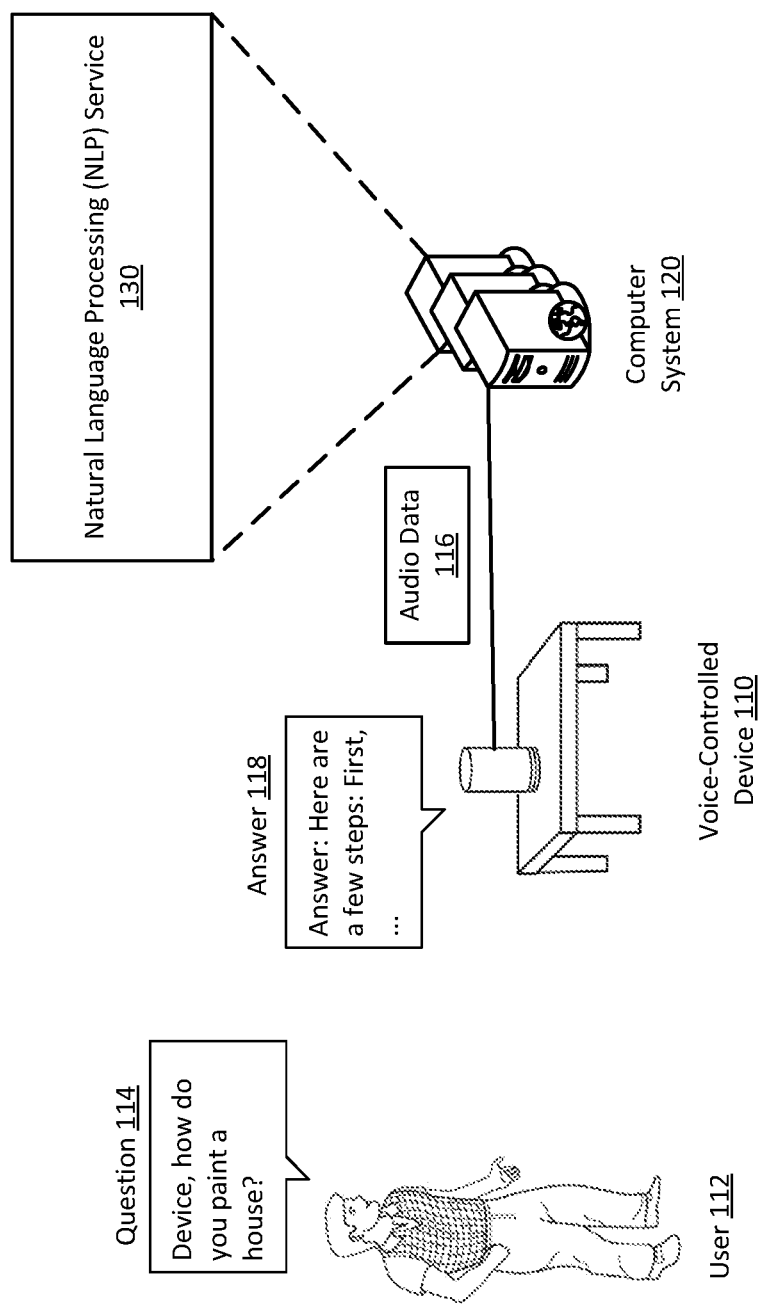
FIG. 1 illustrates example interactions between a user and a voice-based user device in an interaction session, in accordance with various embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, enhancing functionalities of a voice-based user device by providing a reformulated answer that has been curated to be presentable by the user device in response to a query (also known as a "question") by a user. In an example, a user may speak a query to the user device. The user device may receive the query and transmit audio data corresponding to the query to a backend computer system. The backend computer system may receive the audio data and determine an answer to the query. In an example, the answer may be selected by the system as a chosen answer among several answers to a similar query found on a Community Question Answering (CQA) website. As used herein a "CQA website" may refer to a website that provides a forum for receiving open-ended questions and/or open-ended answers from users. The backend computer system may then generate a reformulated answer that is derived from the chosen (e.g., pre-processed) answer by performing at least two phases: (1) generating, from the answer, a plurality of sentences, where each sentence of the plurality is presentable via an output interface (e.g., a speaker) of the user device, and (2) selecting, based at least in part on a machine learning model, a portion of the plurality of presentable sentences. The selected portion can form the reformulated answer, whereby each sentence of the portion is selected based at least in part on a relevance score determined by the machine learning model. The relevance score corresponds to a measure of relevance with respect to the presentable sentence answering the query.

Consider an example of a user device receiving a query from a user by voice input. At the time of voicing the query, the user may be some distance away from the user device and/or other devices and expect to receive the answer via audio-based output from the user device. The question may be associated with any suitable domain (e.g., mathematics, history, do-it-yourself (DIY) activities such as home remodeling, language learning, etc.). Upon the backend computer system receiving the query from the user device, the system may broaden the range of candidate answers to the query from which the system may select a best answer by scanning among non-curated answers to similar questions found on the Internet (e.g., from a CQA website). These non-curated answers may be presented on a website in a form that is not initially suitable for presenting to the user via audio output. For example, the non-curated answers may contain embedded video content, images, complex mathematical formulations, Uniform Resource Locator (URL) links to another website, etc. Upon selecting a chosen answer that is a non-curated answer, the system may curate the answer to generate a reformulated answer suitable for presentation on the user device by performing at least the two phases described further below.

To further illustrate, consider an example where a user speaks a question to a voice-based user device (e.g., a smart speaker), such as, "How do you paint a house?" Upon receiving audio data corresponding to the question by a backend system, the system may analyze a number of answers to similar questions on one or more websites (e.g., CQA websites, DIY websites, etc.), and select a chosen answer that is most relevant to answering that question. The chosen answer may contain some components that may not be suitable for audio-based presentation (e.g., an image of a house, a video of painting a house, a lengthy URL link to another website for more detailed information, a complex formula for mixing paint, etc.). The chosen answer may also contain one or more sentences embedded within the answer that are less relevant to answering the particular question (e.g., a related, but tangential discussion about the re-sale value of a house after being painted). These less relevant sentences may cause the answer to be too long for suitable audio-based presentation in response to the question. The backend system may reformulate the chosen answer to be suitable for audio-based presentation in at least two aspects.

First, the system may remove and/or replace non-presentable components with presentable components. For example, the image of a house may be removed from the chosen answer (and possibly stored for later presentation on another device). In another example, the URL link may be replaced by a shorter moniker that is suitable for audio-based presentation. Second, the system may choose only the sentences within the answer that are most relevant to answering the question (e.g., removing the sentences related to the re-sale value of the home, removing introductory sentences that do not directly answer the question or provide helpful context, etc.). The backend system may then transmit the reformulated answer for presentation on the smart speaker.

Embodiments of the present disclosure may perform a first phase by generating a plurality of presentable sentences from the non-curated answer (herein, a non-curated answer may be referred to as "answer" or "pre-processed answer"), where each presentable sentence of the plurality is presentable via a voice-based interface (e.g., speaker) of the user device. In an example, the answer may be formatted using a Hypertext Markup Language (HTML) format. Accordingly, the system may identify a plurality of data blocks based at least in part on one or more tags within the answer, where each data block corresponds to an HTML element. Accordingly, each data block may be associated with a content element (e.g., text, images, URLs, and other content types expressible within the HTML element) and a metadata element. In some embodiments, the metadata element may correspond to a markup of the content of the HTML element (e.g., bold format, italicize format, paragraph marker, list marker, image marker, etc.) and may be identified by a tag. Based at least in part on the metadata element and/or the content element of each data block of the answer, the system may transform non-presentable components of the data blocks (e.g., images, video content, URLs, etc.) to become presentable components on the voice-based user device. Herein, a transformed data block may be referred to as a "presentable unit." The system may further transform the one or more presentable units into presentable sentences, for example, by splitting or merging the presentable units (e.g., based on text length of a presentable unit, or based on whether the presentable unit should be logically grouped together with other presentable units, etc.). Once the system has generated a plurality of presentable sentences, the system may proceed with phase two.

Embodiments of the present disclosure may perform a second phase by selecting, based at least in part on a machine learning model, a portion of the plurality of presentable sentences (e.g., generated from the first phase). In an example, the machine learning model may be trained with training data to determine a measure of relevance with respect to each presentable sentence answering the query. Accordingly, the machine learning model may be trained to output a relevance score that corresponds to the measure of relevance of a presentable sentence based at least in part on four sets of features. The four sets of features can include, but are not limited to: (1) positional features based on the position of the presentable sentence within the answer, (2) query-sentence similarity features, corresponding to a determination of a similarity between the presentable sentence and the query, (3) lexical features, corresponding to whether the presentable sentence includes certain expressions (e.g., "yes"/"no," "in short," "in conclusion," etc.), and/or (4) structural features, corresponding to structural characteristics of the presentable sentence (e.g., whether part of the presentable sentence is bolded, is a quote, is a list, etc.). The machine learning model may also be generated based at least in part on one or more baseline models, as described in embodiments below. Based on the relevance score output by the machine learning model for each presentable sentence (e.g., producing a set of relevance scores), the system may select a portion of the plurality of presentable sentences based at least in part on a ranking of the set of relevance scores. The selected portion thereby may form the reformulated answer. The backend computer system may then transmit a message containing the reformulated answer to the user device for presentation on the speaker of the user device.

The embodiments of the present disclosure may provide many technical advantages over existing systems. Generally, existing systems may rely on manual or automated processes to configure the system. For example, existing systems may select a chosen answer to a query from a set of curated answers (e.g., manually reformulated answers) that have already been curated to be presentable on a voice-based user device. Generating the manually reformulated answers may involve manual processes that may not be scaled to include a large corpus of question-answer pairs, thus reducing scalability. Also, system accuracy is also reduced at least because manual processes are often tedious to perform and may introduce errors during the curation process. Furthermore a smaller corpus of candidate answers from which to select a chosen answer may reduce the likelihood of selecting a globally optimal answer. In another example, existing systems may rely on simple automated processes for selecting an answer. For example, an existing system may retrieve the first few sentences from a webpage on a predetermined encyclopedic website, whereby the webpage provides curated information about a topic that is determined to be relevant to the question. However, this form of automation still may restrict the system to selecting from a narrower set of already curated answers, thus reducing scalability and accuracy.

In contrast, the embodiments of the present disclosure provide at least the technical advantages of efficiency, scalability, and accuracy. In particular, the backend computer system may provide greater scalability by being able to retrieve from a larger corpus of available open-ended answers to open-ended queries on the Internet, including answers that may not be initially suitable for presentation on a voice-based user device. Furthermore, the system provides greater efficiency. For example, upon selecting a chosen answer, the system may generate, without manual intervention, a reformulated answer that is suitable for presentation on the voice-based user device. Finally, the system may provide greater accuracy than existing systems, in part, by drawing from a richer corpus of available information and then selecting the best answers from the richer corpus of information. For example, an answer to an original question on a CQA website may typically contain rich information that may be used to answer not only the original question that was asked in the CQA forum, but also several related questions (e.g., the present question asked on a voice-based user device). Embodiments of the present disclosure enable automatically generating a reformulated answer by selecting information from the answer to the original question on the CQA website that is most relevant to the present question asked, while discarding other aspects of the answer that are less relevant to the present question. In this way, the system may provide reformulated answers with greater relevance to the question asked to the user device. Accuracy may also be improved by reducing the possibility of errors that may otherwise be introduced via manual curation processes.

Finally, this automated process may perform answer reformulation for each new question asked to the system, thus improving overall accuracy over a wide range of questions in a way that manual processes may not achieve.

In the interest of clarity of explanation, the embodiments of the present disclosure are described in connection with an Internet website (e.g., a CQA website) that provides webpages containing queries and answers to the queries. Each webpage is formatted in HTML format, which the system may utilize when generating presentable sentences. However, it should be understood that the source for retrieving an answer is not limited to the Internet. For example, the system may draw candidate answers from a public or private database, file system, etc. Also, the format of each candidate answer need not be limited to HTML format. In an example, the format of a pre-processed answer may use eXtensible Markup Language (XML).

FIG. 1 illustrates example interactions 100 between a user and a voice-based user device in an interaction session, in accordance with various embodiments. As illustrated, the interaction session corresponds to a dialog between the user 112 and the voice-based user device 110 (depicted in FIG. 1 as resting on a table) in which the user 112 asks a question 114, and the user device 110 presents a voice-based answer 118 to the question. The interaction session may be supported by communications between the voice-based user device 110 and a backend computer system 120, as further illustrated in FIG. 2.

In an example, the voice-based user device 120 can be any suitable computing device including one or more processors, one or more memories, and one or more interfaces for executing one or more applications, interacting with the user 110, interfacing with remote computing devices, and the like, where the interface(s) include a voice-based interface capable of input and output. For instance, the voice-based user device 110 may be a smart speaker providing an intelligent personal assistant service responsive to a wakeword and capable of different interactions including content playing, providing real-time information, and performing tasks and routines. In another illustration, the voice-based user device 110 may be any other computing device hosting an intelligent personal assistant service and/or other applications. For instance, the computing device 110 can be a mobile phone, a tablet, a desktop computer, a smart television, or any other user device having one or more processors, one or more memories, and a voice-based interface.

Generally, the voice-based user device 110 may perform natural language processing on a user utterance (e.g., "Device, how do you paint a house?") of the user 110. If this processing indicates that the user utterance includes a wakeword of the voice-based user device 110 (e.g., such as "Device"), the voice-based user device 110 may proceed locally with an analysis of the user utterance and/or may send audio data 116 representing the user utterance to the backend system 120 for further analysis. It should be understood that the user device 110 may receive a user utterance from the user 112 in the form of a question 114 from a range of possible domains (e.g., types of questions). In a non-limiting example, these domains may include DIY activities (e.g., home remodeling), earth science, economics, movies, literature, English, computer science, etc.

In some embodiments, the backend computer system 120 may receive the audio data 116 and input the audio data 116 into a natural language processing (NLP) service 130. The NLP service 130 may determine an answer 118 to the question 114 based in part on the domain of the question asked. In an example, based at least in part on a determination of the domain of the question and/or information corresponding to the specific question asked, the NLP service 130 may retrieve a list of candidate answers from one or more sources. For example, the NLP service 130 may contact a CQA website that is associated with the particular domain of the question (e.g., a website that is dedicated to providing DIY advice). The NLP service 130 may then determine a similarity (e.g., lexical similarity) between question 114 and other questions previously posted onto the CQA website. Upon finding a similar question on the CQA website, the NLP service 130 may select the chosen answer (e.g., determined in part based on community voting on the CQA website) to the similar question. While the procedure above describes one way for the NLP service 130 of the computer system 120 to select an answer to the question 114, it should be understood that the NLP service 130 may select an answer using any suitable method. For example, the NLP service 130 may retrieve candidate answers from multiple sources (e.g. multiple websites). In another example, instead of relying on community voting, the NLP service 130 may determine a selected answer from a list of candidate answers using a machine learning model.

Once the computer system 120 chooses an answer, the computer system 120 may reformulate the answer to be suitable for presentation on the voice-based interface of the user device 110. For example, the answer as originally selected by the computer system 120 from a particular website may be formatted using metadata elements (e.g., utilizing HTML tags associated with markup of an HTML element). Additionally, the answer may include content elements that are not suitable for voice-based output on the user device 110. In an example, the answer may contain content elements such as URLs, pictures, computer code, complex mathematical formulations, special markers (e.g., ==> which may translate to "implies"), and/or other elements that are not suitable for voice-based output. The answer may also be longer than would be suitable for voice-based output on the user device 110. For example, in the case where the user 112 asks a question to the device 110, the user may be expecting a relatively short answer to the question (e.g. less than a minute). However, the selected answer may be not initially suitable for voice-based output, especially in the case where it may be selected from a CQA website, where written answers may be longer and more detailed. The answer reformulation process, described further in embodiments below, corresponds to the process of generating a reformulated answer from a pre-processed answer that may have non-presentable components (e.g., included within content elements and/or metadata elements) and/or may contain too many words for presentation. Once the answer reformulation process is complete, the computer system 120 may transmit a message containing the reformulated answer (e.g., in the form of audio data 116) to the user device 110 for voice-based presentation of the reformulated answer 118.

Figure 2:
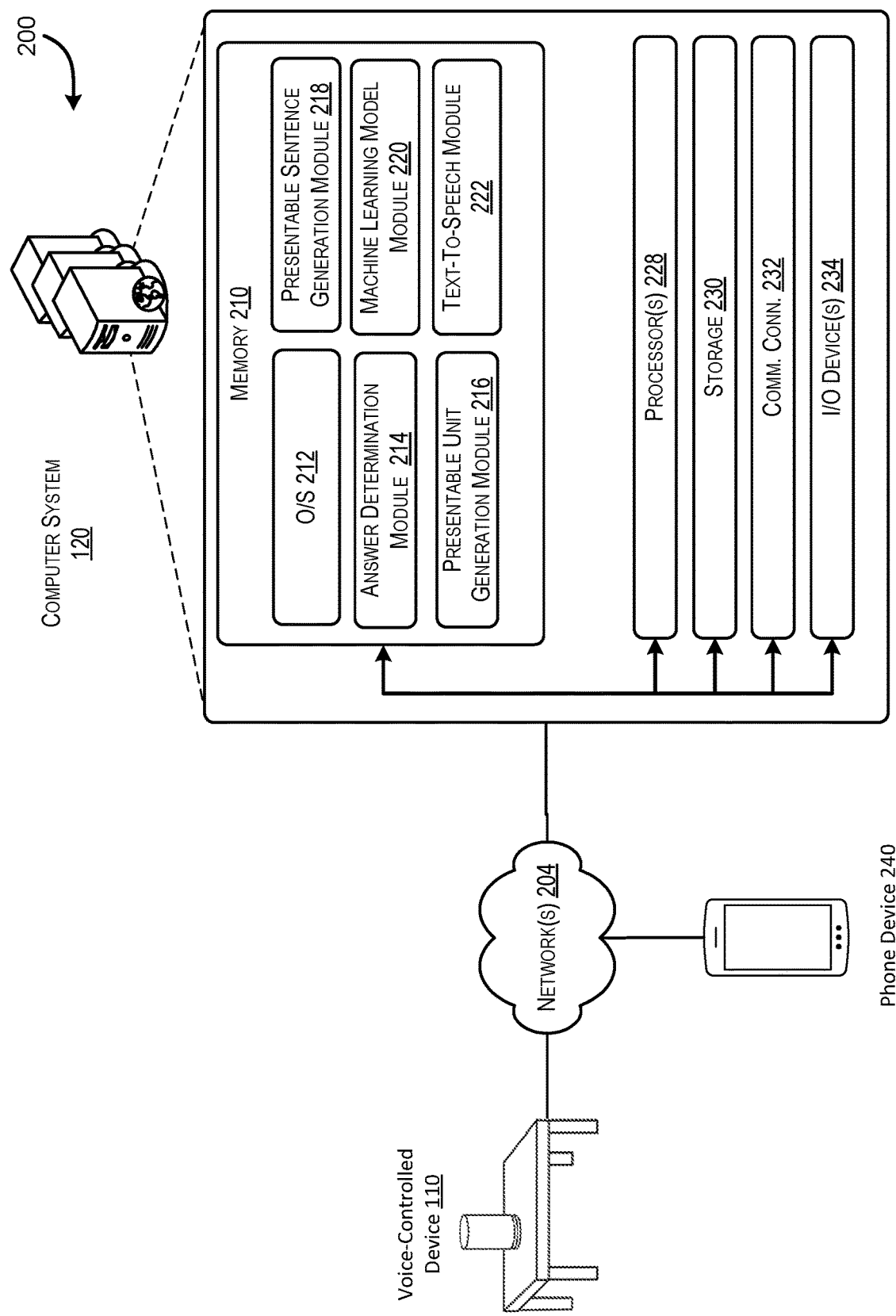
FIG. 2 illustrates an example architecture of a computer system to support an interaction session, in accordance with various embodiments.

FIG. 2 illustrates an example architecture of utilizing a computer system to support an interaction session, in accordance with various embodiments. In the block diagram 200 of FIG. 2, the voice-controlled user device 110 may be communicatively coupled to the backend computer system 120 via a network 204. For example, the backend computer system 120 may operate within a cloud environment (e.g., a cluster of computer servers). Alternatively, the user device 110 may be coupled via hardware to the computer system 120 as part of a single hardware unit. For example, the user device 110 may be configured to perform embodiments of the present disclosure on the premises (e.g., within a user's home environment). Additionally, especially in the case where the user device 110 may be a voice-based user device that is limited to voice as the only input/output modality, the user 112 may optionally also be associated with another computing device that has a visual modality (e.g., mobile phone device 240), which is also communicatively coupled to the computer system 120. The network 204 may include any one or a combination of many different types of networks, such as cable networks, the Internet, wireless networks, cellular networks, and other private and/or public networks.

In some embodiments, the user 112 may be associated with a user account that may store user preferences. In an example, the user 112 may login with his or her user account credentials to the user device 110 and/or phone device 240. In this example, the system 120 may then receive user preferences of the user 112 that correspond to the type of response that the user 112 may expect in response to a particular type of question. For example, the user device 110 (and/or computer system 120) may receive input specifying that, upon receiving a question 114 relating to science and technology (e.g., when user 112 is logged in or determined to be nearby, or the user's voice is detected), the user device 110 should return an answer that is chosen from a particular source (e.g., a particular website). In another example, a user preference may specify a verbosity constraint for the answer to a particular type of question. For example, an answer to a science and technology related question may be limited to less than one-hundred words, whereas an answer to a literature question may limited to fifty words. Any suitable type of user preferences and or constraints may be implemented within embodiments of the present disclosure. It should be understood that the system 120 may receive user preferences via any suitable method (e.g., voice input, keyboard input, etc.). In some embodiments, the system 120 may determine user preferences based at least in part on previous interactions with the user 112 (e.g., learned patterns from previous interaction sessions, input by the user 112 indicating whether the user 112 was satisfied with a previous answer presented by the system 120, etc.). Also, in some cases the user may be associated with a default profile, in which case the computer system 120 may default to answering a question according to a predetermined method (e.g., all answers to questions must fit within a certain word and/or sentence limit).

Turning to the contents of the computer system 120 in more detail, the computer system 120 may comprise at least one memory 210, one or more processing units (or processor(s)) 228, a storage unit 230, a communication device 232, and an I/O device 234. The processor(s) 228 may be implemented as appropriate in hardware, computer-executable instructions, firmware or combinations thereof. Computer-executable instruction or firmware implementations of the processor(s) 228 may include computer-executable or machine executable instructions written in any suitable programming language to perform the various functions described.

The memory 210 may store program instructions that are loadable and executable on the processor(s) 228, as well as data generated during the execution of these programs. Depending on the configuration and type of computer system 120, the memory 210 may be volatile (such as random access memory (RAM)) and/or non-volatile (such as read-only memory (ROM), flash memory, etc.). In some implementations, the memory 210 may include multiple different types of memory, such as static random access memory (SRAM), dynamic random access memory (DRAM) or ROM. The computer system 120 may also include additional storage 230, such as either removable storage or non-removable storage including, but not limited to, magnetic storage, optical disks, and/or tape storage. The disk drives and their associated computer-readable media may provide non-volatile storage of computer-readable instructions, data structures, program modules, and other data for the computing devices. The computer system 120 may also contain communications connection(s) 232 that allow the computer system 120 to communicate with a stored database, another computing device or server, user terminals, and/or other devices on the network(s) 204. The computer system 120 may also include input/output (I/O) device(s) and/or ports 234, such as for enabling connection with a keyboard, a mouse, a pen, a voice input device, a touch input device, a display, speakers, a printer, etc.

Turning to the contents of the memory 210 in more detail, the memory 210 may include an operating system 212 and one or more application programs or services for implementing the features disclosed herein, including an answer determination module 214, a presentable unit generation module 216, a presentable sentence generation module 218, a machine learning module 220, and a text-to-speech module 222. One or more of the modules included within the memory may comprise the NLP service 130 of FIG. 1.

The operating system 212 may provide executable program instructions for the general administration and operation of computer system 120 and typically will include a computer-readable storage medium (e.g., a hard disk, random access memory, read only memory, etc.) storing instructions that, when executed by a processor of the computer system 120, allow the computer system 120 to perform its intended functions. Suitable implementations for the operating system and general functionality of the servers are known or commercially available and are readily implemented by persons having ordinary skill in the art, particularly in light of the disclosure herein.

The answer determination module 214 may be responsible for receiving audio data 116 from the user device 110 and determining an answer from the audio data 116. In some embodiments, the answer determination module may determine the question 114 from the audio data 116 (e.g., using a speech-to-text conversion service), determine a set of candidate answers to the question 114 (e.g., using one or more of the methods described in reference to FIG. 1), and then select an answer from the set of candidate answers. As discussed earlier, this answer may be known as the pre-processed answer (or "answer"), from which the reformulated answer will be generated. In some embodiments, the pre-processed answer may be encoded in HTML format (or other markup language). In some embodiments, the pre-processed answer may be in plaintext or other suitable encoding understood by the computer system 120. In some embodiments, the answer determination module 214 may store the pre-processed answer in memory 210 or storage 230 to be used as a reference by one or more of the other modules, as described below.

The presentable unit generation module 216 may be responsible for generating one or more presentable units based at least in part on the pre-processed answer that was determined by answer determination module 214. In some embodiments, the presentable unit generation module 216 may first identify non-presentable components of the pre-processed answer. The non-presentable components may correspond to, by way of example only, images, videos, pictorial representations using text (e.g., emoticon), URLs, phonemes, text-based symbols (e.g., "=>"), computer code (e.g., using a programming language), mathematical formulations (e.g., equations), text in parentheses (which may not be crucial for understanding the answer), and/or metadata elements (e.g., HTML tags). In some embodiments, the presentable unit generation module 216 may then remove or replace the non-presentable components from the pre-processed answer. In some embodiments, the module 216 may remove the non-presentable components without any further action in regard to the non-presentable components. However, in other embodiments, the non-presentable components may be stored in memory 210 and associated with the particular question 114 and/or the account of the user 112. In an example, at a later time, when user 114 may have access to his or her phone device 240 (e.g., or another device that presents visual output on a display), the user may log into his or her account and may be able to retrieve a more complete answer to the question 114 previously asked, which may include the non-presentable components of the pre-processed answer. In some embodiments, and as described further below in reference to FIGS. 3 and 4, the non-presentable components may be substituted with presentable components. For example, a text-based symbol like "=>" may be substituted with "imply" or "implies." In some cases, for example, when a non-presentable component is removed without substituting in any text-based element, an empty string (e.g., null string (" ")) may be substituted in to replace the non-presentable component.

The presentable sentence generation module 218 may be responsible for generating a plurality of presentable sentences from the one or more presentable units generated by the presentable unit generation module 216. Whereas the presentable unit generation module 216 was primarily focused on handling non-presentable components within the pre-processed answer, the presentable sentence generation module 218 may be primarily focused on ensuring that the presentable units are grouped together into readable units, such that each readable unit is suitable for being presented on a voice-based interface of the user device 110. In some embodiments, suitability of a readable unit for presentation may be determined at least as a function of the number of words and/or whether one group of words should be logically grouped with another group of words. As used herein, a "presentable sentence" is a readable unit that is suitable to be presented on the user device 110 using at least one of the criteria for suitability described above. Accordingly, a single presentable unit may split to become one or more presentable sentences. Moreover, two or more presentable units may be combined to form a single presentable sentence.

The machine learning module 220 may be responsible in part for determining a portion of the plurality of presentable sentences that were generated by the presentable sentence generation module 218, the portion corresponding to the reformulated answer 118. The machine learning module 220 may proceed by determining, for each presentable sentence of the plurality of presentable sentences, a relevance score. The relevance score may correspond to a measure of relevance with respect to the particular presentable sentence answering the query. Based on a ranking of the set of relevance scores, the system 120 may select the portion of the plurality of presentable sentences. In some embodiments, the system 120 may select the portion based in part on a predetermined word threshold, whereby the word threshold corresponds to a maximum number of words that may be included in the reformulated answer (e.g., summing up the number of words across all the selected presentable sentences).

The text-to-speech module 222 may be responsible for converting the reformulated answer 118 into audio data 116 which may then be transmitted within a message to the user device 110 for presentation. In some embodiments, the computer system 120 may utilize any suitable text-to-speech converter. In some embodiments, the message transmitted to the user device 110 may additionally include one or more sentences (beyond the reformulated answer 118) which direct the user to find more information by logging into his or her user account on another user device (e.g., phone device 240). For example, the additional sentence may report, "Certain portions of the original answer from which this answer summary was generated have been redacted and saved for future viewing. For more information, please see your virtual assistant application on your mobile device." These additional portions may include, for example, non-presentable components (e.g., videos, images) that were not suitable for voice-based presentation. The additional portions may also include a more complete answer, whereby the entire pre-processed answer is available for the user to view on his or her phone device 240. In other embodiments, the text-to-speech module 222 may similarly include another sentence within the message that is sent to the user device 110. The additional sentence may inform the user 112 that he or she may request the entire set of presentable sentences to be read aloud to the user via the user device 110 (e.g., not only the portion of the sentences determined within the reformulated answer 118).

Figure 3:
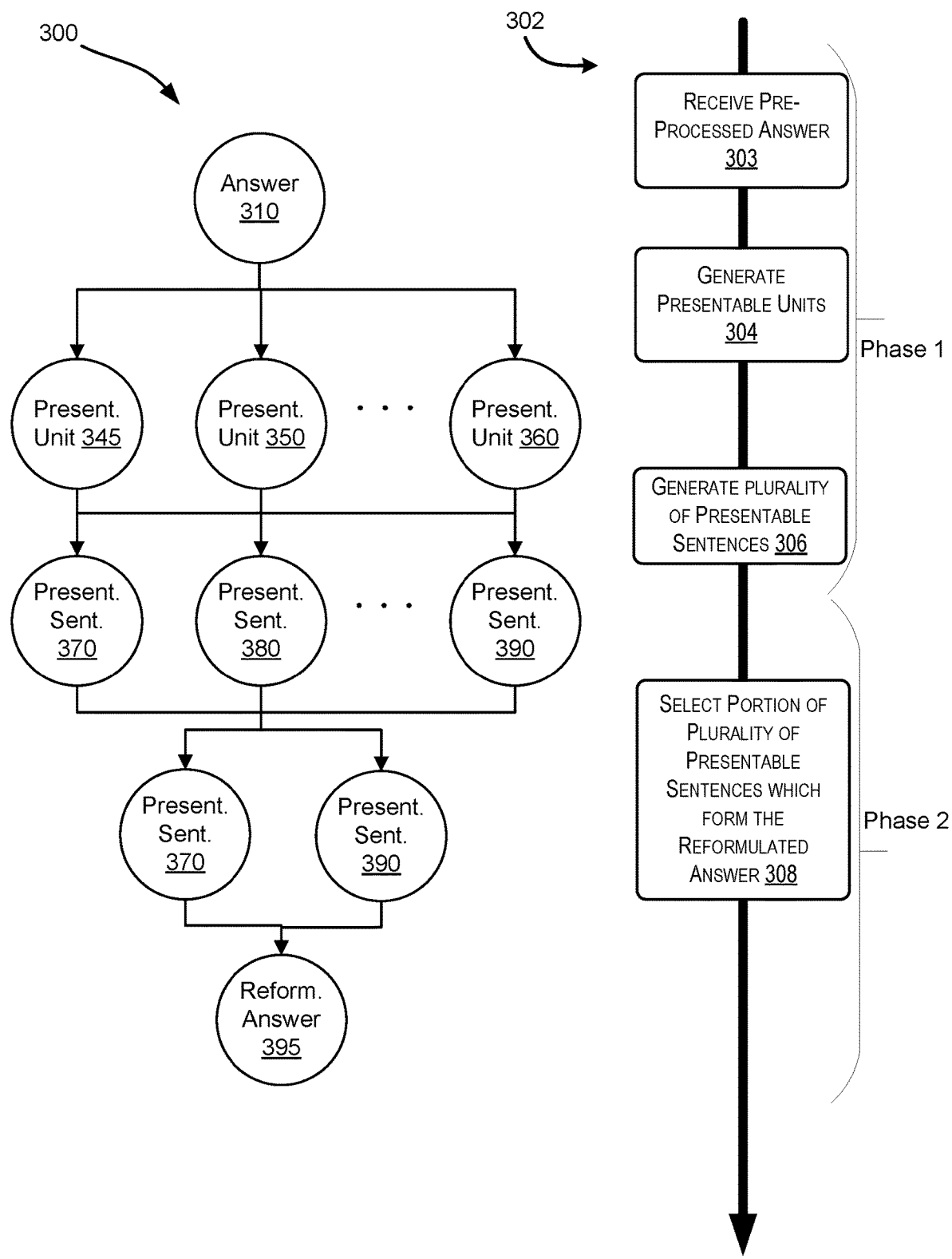
FIG. 3 illustrates a data transformation flow performed by a computer system during an interaction session, in accordance with various embodiments.

FIG. 3 illustrates a simplified block diagram 300 depicting an example process 302, in accordance with at least one example. The process 302 is an example process for generating a reformulated answer 395 from a pre-processed answer 310. The block diagram 300 depicts an example data transformation flow performed by a computer system when generating the reformulated answer, in accordance with various embodiments. As depicted, the process 302 may be performed in two phases. Phase one may include at least two steps (e.g., step 304 and steps 306), each of which may have sub-steps, as described further below in relation to diagram 300 as well as in reference to FIG. 4. Phase two may include at least one step (e.g., step 308), which may in turn include sub-steps, as described further below in relation to diagram 300 and in reference to FIGS. 5 and 6.

The process 302 begins at step 303 whereby the computer system may first receive a pre-processed answer 310 to a question 114 (e.g., selected by the system 120 using a method described above). For clarity of illustration, diagram 400 of FIG. 4, which provides an illustration for performing the steps of phase one using an HTML-based example of a pre-processed answer, will be referenced alongside a description of phase one of the process 302.

As depicted in flow diagram 400, the pre-processed answer 310 may correspond to HTML data block 402. The data block 402 may be selected by the computer system 120 in response to receiving question 114 (e.g., "How do you paint a house?"). The data block 402 is defined by a metadata element and a content element. For example, in block 402, the metadata element is included within and defined by the <div . . . > start tag and </div> end tag, which also define the boundaries of the data block 402. The <div . . . > start tag includes attributes (e.g., 'class="post-text"') which further define an aspect of the metadata element of data block 402. The content element of data block 402 itself includes multiple nested data blocks. Each of these nested data blocks may also include both a metadata element and a content element. It should be understood that there may be multiple layers of nesting of data blocks within a given data block. For example, in data block 402, the pre-processed answer 310 includes a data block that corresponds to a first paragraph, the data block defined by the <p>/</p> tags. This data block itself includes a data block that corresponds to a hyperlink (e.g., defined by the <a href . . . >/</a> tags). It should be understood that many possible variations are possible to perform embodiments of the present disclosure, including using a variety of different tags, attributes, and/or nesting variations.

Turning to aspects of the content element of data block 402, the first paragraph includes a parenthetical expression within the first sentence. In the second sentence of the first paragraph, a hyperlink to a URL is included, where further relevant information may be found. Following the first paragraph is an introductory paragraph that introduces an ordered list of steps involved in painting the house, whereby the introductory paragraph contains an opening statement that includes a colon (e.g., ":"). Note that the list's first paragraph element includes an image element. Following the ordered list, the data block 402 contains a final paragraph with two sentences. Note that a pictorial representation (e.g., "=(")) of a face is included in the first sentence of the last paragraph.

At step 304, the computer system may generate one or more presentable units 345, 350, 360, etc., based on the pre-processed answer 310. In some embodiments, the computer system 120 may proceed by removing and/or replacing non-presentable components of an associated data block, for each data block within the pre-processed answer 310. For example, turning back to FIG. 4, the system 120 may determine for the first sub-data block within data block 402 (e.g., first paragraph) that the parenthetical expression within the first sentence (e.g., "(some methods are better than others)") may be removed because it likely contains information that is not essential to answering the question. The system 120 may also determine that the URL should be replaced with a presentable component. More specifically, the system may first determine if an anchor text exists for the hypertext reference attribute within the anchor element tag. In this case, anchor text does exist (e.g. "https://www.example.com/watch? . . . "). The system 120 may then further determine if the anchor text is suitable for presentation. Here, the anchor text may not be suitable for presentation, and the system 120 may accordingly determine to replace the data block with a presentable component. For example, the system 120 may substitute "a known website" for the data block corresponding to the hyperlink to the URL (e.g., <a href . . . > . . . </a>). In this case the substitute sentence may read as " . . . you can find a more detailed description at a known website." In other embodiments, the system 120 may perform other suitable substitutions, including, but not limited to, truncating portions of the URL beyond the website domain name (e.g., the text preceding and/or following "example.com"). In some embodiments, if there is no anchor text, the system may substitute in any suitable text (e.g., "a known website"). The URL information may be stored (e.g., to memory 210 or storage 230 in the cloud) for later retrieval and presentation on another device (e.g. phone device 240), as discussed earlier.

In another example, the data block corresponding to the ordered list may be analyzed by the system. Within the ordered list, a data block corresponding to the first list element may be analyzed. Within this first list element (and within the corresponding paragraph element), the system 120 may determine that the image element corresponds to a non-presentable component. Accordingly, the system 120 may remove that image element entirely. In some embodiments, this may be done by substituting the image element for an empty string. Finally, in another example involving the last paragraph, the system 120 may determine that the pictorial representation of a face should be removed as a non-presentable component. It should be understood that, in general, for each of the non-presentable components, the system may determine whether the non-presentable component should be removed or replaced based in part on the type of content element and/or metadata element associated with the non-presentable component (e.g., whether a hyperlink to a URL contains an anchor text, as described above, or whether there is a known translation between the non-presentable component and a presentable component).

Upon removing all of the non-presentable components from the pre-processed answer 310, the remaining data blocks (and nested data blocks) may respectively correspond to presentable units, as shown in block 404 (e.g., note that presentable units may be nested). In the example of block 404, some of the tags are still included (e.g., tags that provide markup and structure regarding content elements), which may be utilized in subsequent steps (e.g., step 306 of FIG. 3) to determine presentable sentences from the organization of the presentable units. In some embodiments, the tags may also be used to help rank presentable sentences in phase two. In block 404, four top-level presentable units are shown, including the first paragraph (which may correspond to presentable unit 345 of FIG. 3), the second paragraph (e.g., presentable unit 350), the ordered list (which itself includes presentable units), and the last paragraph (e.g. presentable unit 360).

Turning next to step 306 of process 302 in FIG. 3, the system 120 may generate a plurality of presentable sentences. The plurality of presentable sentences may be based at least in part on the presentable units that were generated in step 304. As described above, one or more presentable units (including nested presentable units) may be combined together or split apart to form one or more presentable sentences. For illustration purposes, consider the transformation between presentable units of block 404 and presentable sentences of block 406. For example, the presentable unit of the first paragraph in block 404 may be split into two different presentable sentences, as shown in the first two sentences of block 406. Furthermore, the system 120 may combine nested presentable units within the ordered list into one presentable sentence. The system 120 may also analyze the introductory paragraph to the ordered list, and determine that it should logically be combined with the ordered list into one presentable sentence. Generally speaking, the system 120 may perform the combining or splitting of presentable units based at least in part on an aspect of the metadata element or an aspect of the content element of each data block that is associated with the respective presentable unit. For example, the system may determine that the introductory paragraph to the ordered list contains a colon (e.g., an aspect of the content element), and thus should be included with the ordered list. Additionally, the system may determine, based at least in part on an aspect of the metadata elements within the tags (e.g., the type of each tag), that each list element belongs to the ordered list, and thus should be grouped together within a single presentable sentence (e.g., to be read together as an indivisible piece of text to express a concept). Accordingly, the system may group the introductory paragraph and the entire ordered list into a single presentable sentence (e.g., the third sentence of block 406). Finally, similar to the first paragraph, the system may split the last presentable unit (e.g., paragraph) into two presentable sentences (the fourth and fifth sentences of block 406).

This may be based in part on the number of words allowable in a given presentable unit. Presentable units that are short (e.g., less than 25 words) may be considered a readable unit (e.g., standalone presentable sentence). Presentable units that are longer may be further split. In some embodiments, the splitting process may be performed by a third party tool (e.g., Stanford Core NLP). The presentable sentences of block 406 may generally correspond to presentable sentences 370, 380, . . . , 390 of FIG. 3.

As described earlier, although the system 120 may remove the HTML tags as a final step when generating the presentable sentences (as shown in block 406), the system 120 may maintain a mapping between the presentable sentences and the one or more tags that each presentable sentence is associated with. As described further below, this mapping may be used in phase two when generating a relevance score for each presentable sentence.

Turning next to step 308 of process 302 in FIG. 3, the system 120 may select a portion of the plurality of presentable sentences which form the reformulated answer. The process for determining which portion to select is described further below in reference to FIGS. 5 and 6. As depicted in FIG. 3, the selected portion may include presentable sentences 370 and 390. In an example, this may correspond to the third and fifth sentences of block 406. This portion of presentable sentences may thereby form the reformulated answer 395. As described above, in some embodiments, the reformulated answer 395 may be supplemented with additional instructions that are included within a message that is subsequently transmitted by the computer system 120 to the user device 110 for presentation.

Figure 5:
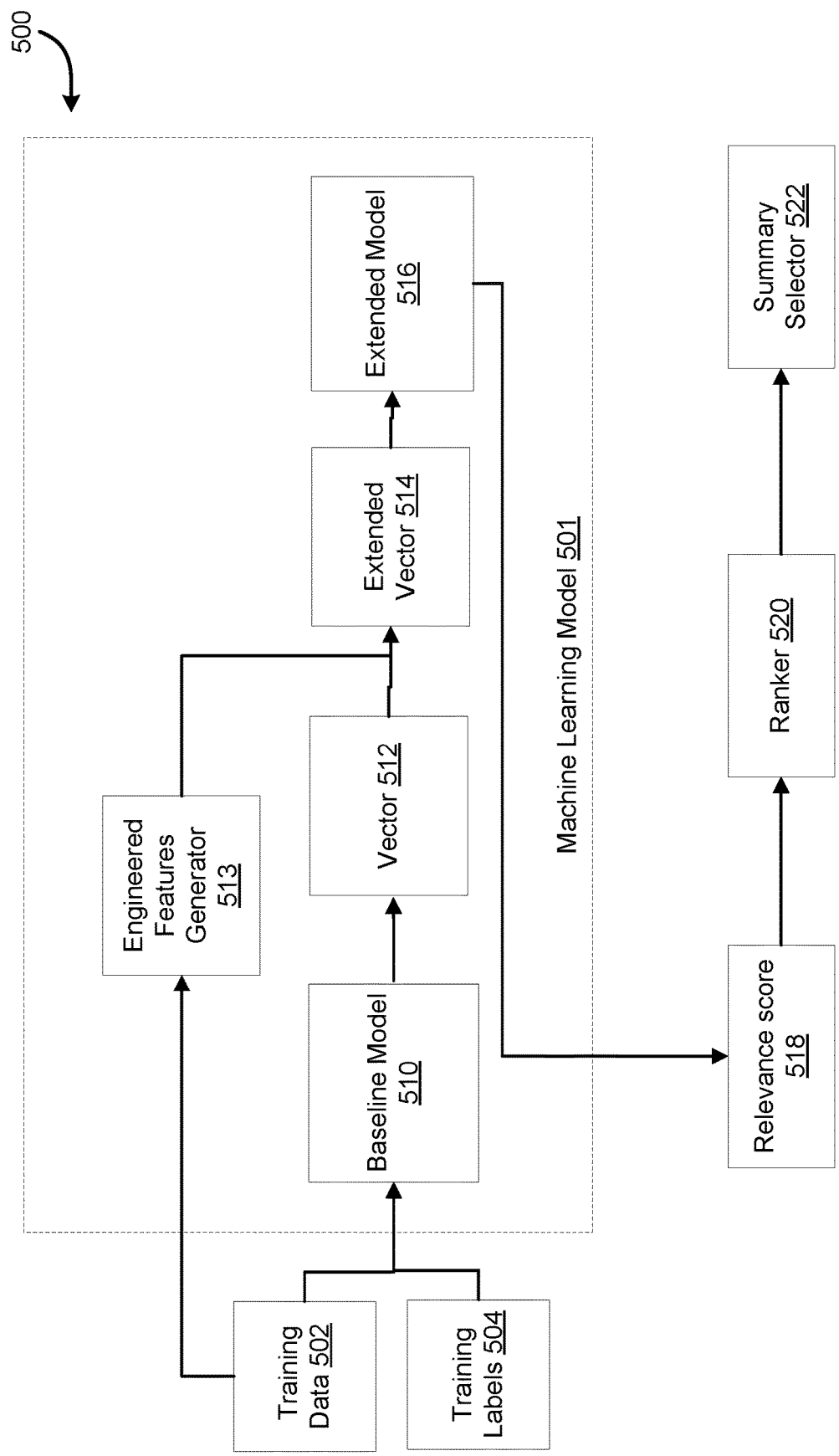
FIG. 5 illustrates an example machine learning model of a computer system that is trained to support an interaction session, in accordance with various embodiments.

FIG. 5 illustrates an example diagram 500 for utilizing a machine learning model of a computer system to support an interaction session, in accordance with various embodiments. In some embodiments, once trained, the output of the machine learning model 501 of FIG. 5 may be used to select a portion of a plurality of presentable sentences within phase two (e.g., as depicted in step 308 of FIG. 3). Specifically, the machine learning model 501 may be trained to output a relevance score that is associated with a presentable sentence of the plurality of presentable sentences. The relevance score may correspond to a measure of relevance with respect to the presentable sentence answering the query. The relevance score for each presentable sentence may be ranked among a set of relevance scores that correspond to the plurality of presentable sentences. Finally, a portion (e.g., summary) of the plurality may be selected based at least in part on the ranking. In some embodiments, each of the components depicted in diagram 500 may be included within the NLP service 130 of computer system 120 of FIG. 1, and/or implemented by one or more of the modules of computer system 120 of FIG. 2.

In FIG. 5, a machine learning (ML) model 501 is trained to output a relevance score 518. It should be understood that, although a particular implementation of machine learning model 501 is described below, any suitable implementation may be used to perform embodiments of the present disclosure. In the example of FIG. 5, ML model 501 includes two ML models that are chained together, a baseline model 510 and an extended model 516, which ultimately output a relevance score 518. In one embodiment, the baseline model 510 corresponds to a Bidirectional Encoder Representations from Transformers (BERT)-based model, and the extended model 516 corresponds to a multi-layer perceptron (MLP) model that is a feedforward neural network. For more information on the BERT-based model, see Devlin, J., Chang, M., Lee, K., & Toutanova, K. (2018); *BERT: Pre-training of Deep Bidirectional Transformers for Language Understanding*. In some embodiments, the BERT-based model may be a pre-trained cased or uncased model, the pre-trained model having been previously trained on a set number of parameters. In some embodiments, the BERT-based model and the MLP model may be trained based at least in part on training data 502 and corresponding training labels 504, discussed further below in reference to FIG. 6.

Upon the BERT model 510 receiving as input a question and a sentence, the BERT-based model may output a first output token (e.g., a classification ([CLS]) token) that corresponds to vector 512. Vector 512 may correspond to a representation of the question-sentence pair (e.g., a presentable sentence, and a corresponding question 114). The output of the BERT-based model may be extended by concatenating the vector 512 with an encoding of additional features to produce an extended vector 514, the additional features corresponding to aspects of the relationship between the question 114, the presentable sentence (e.g., presentable sentence 370), and/or the pre-processed answer 310. These additional features may be categorized into at least four sets of features and are described further below. The extended vector 514 may be input into the extended model 516, which may be trained to output the relevance score 518, as described above.

Turning to the sets of features described above, which are used to generate the extended vector 514, these sets of features may be generated from an engineered features generator 513. It should be understood that although four sets of features are described below, any suitable set of one or more features corresponding to aspects of the relationship between the question 114, the presentable sentence (e.g., presentable sentence 370), and/or the pre-processed answer 310 may be used to implement embodiments of the present disclosure. The generator 513 may first receive as input a question 114 and answer sentence (e.g., presentable sentence 370) pair. It should be understood that presentable sentence 370 is discussed below as a stand-in example for any of the presentable sentences of the plurality of presentable sentences generated at step 306. Also, note that the generator 513 may also have access to the complete pre-processed answer 310, which may have been stored in memory 210.

The first feature set may include positional features that are based on the position of the presentable sentence 370 within the pre-processed answer 310. For example, positional features may correspond to whether the sentence 370 is the first sentence, the last sentence, etc.

The second feature set may include question-sentence similarity features, which may correspond to similarities between the presentable sentence 370 and the question 114. There are at least three different types of question-sentence similarity features which may be measured and encoded within the extended vector 514. First, lexical similarities may be measured. For example, a Jaccard similarity coefficient may be used to measure the similarity between the question 114 and the presentable sentence 370. In other embodiments, the Levenshtein distance may be measured between the question 114 and the presentable sentence 370. In yet other embodiments, the length of the longest common substring between the question 114 and the presentable sentence 370 may be measured. Second, word-embedding similarities may be measured. For example, the words in the question 114 and the presentable sentence 370 may be respectively grouped according to the parts-of-speech (PoS) (e.g., nouns only, verbs only, adverbs only, adjectives only, and all remaining PoS). Another group may include all the words in the presentable sentence 370. Then, the word embeddings from each group (e.g., represented as vectors)

may be averaged and the system may compute the cosine similarities between the resulting question vectors and sentence vectors. In some embodiments, the system may use Global Vectors for Word Representation (GloVe) to compute the word-embedding similarities (e.g., using pre-trained 300 dimensional word embeddings from GloVe). For more information about GloVe, see Pennington, Jeffrey, Richard Socher and Christopher D. Manning. "Glove: Global Vectors for Word Representation." *EMNLP* (2014). In some embodiments, in addition to computing word embedding vectors and then computing the cosine similarities, the system may compute an alignment score. The alignment score may correspond to a computation, for each word in the question 114, of the most similar word in the presentable sentence 370 (e.g., with both words having the same PoS group). The system 120 may use the average of these maximal similarities as additional inputs into the second feature set. In some embodiments, a sentence-embedding similarity feature may also be employed. For example, the cosine similarities between the question embeddings and the sentence embeddings may be obtained (e.g., utilizing the Universal Sentence Encoder) and used as additional inputs. For more information on the Universal Sentence Encoder, see Cer, D., Yang, Y., Kong, S., Hua, N., Limtiaco, N., St. John, R., Constant, N., Guajardo-Cespedes, M., Yuan, S., Tar, C., Sung, Y., Strope. B., and Kurzweil R. *Universal Sentence Encoder* (2018).

The third feature set may include lexical characteristics features. For example, the lexical characteristics features may correspond to whether the presentable sentence 370 includes a "yes/no" affirmation, and/or summary expressions such as 'in short', 'in conclusion', etc.

The fourth feature set may include structural characteristics features. In some embodiments, these structural characteristics features may correspond to an indication of whether the presentable sentence 370 was included within the original answer that was retrieved from the website (e.g., the CQA website). The structural characteristics features may also indicate, if the sentence 370 was not included in the original answer, which version of the answer the sentence 370 was retrieved. Note that on some CQA websites, several candidate answers may be posted, and each candidate answer may be edited/revised one more or more times. In some embodiments, the structural characteristics may also correspond to HTML structural characteristics. For example, this may correspond to whether part of the presentable sentence 370 is bolded, is a quote, is included in a list, etc. As described above, this information may be retrieved based at least in part on a previous association between the plurality of presentable sentences and the presentable units (e.g., included within block 404) from which the presentable sentences were derived (e.g., which may include HTML tag information).

Returning to the engineering features generator 513, the generator 513 may generate and encode data corresponding to features from each of these four feature sets as described above, and concatenate the data to vector 512 (e.g., previously produced by the BERT-based model) to produce extended vector 514. The extended vector 514 may then be input into the extended model 516, which may produce relevance score 518.

As mentioned above, any suitable ML model 501 may be used to implement embodiments of the present disclosure. As another non-limiting example, a LambdaMART learning algorithm may be employed. Whereas the BERT-based model described above may utilize a pointwise approach (e.g., whereby the model receives as input a question and answer pair, and then outputs a relevance score), a LambdaMART implementation may utilize a pairwise approach. More specifically, in the LambdaMART implementation, features from each of the four feature sets described above may be used to directly represent each sentence pairing (in contrast with the BERT-based model, which may concatenate the features from the feature sets onto the vector 512 produced by the BERT-based model, to produce an extended vector 514). The LambdaMART algorithm may then perform pairwise analysis by analyzing presentable sentences in pairs, to determine which presentable sentence should be ranked first. For example, presentable sentence 370 may be compared with presentable sentence 380, and presentable sentence 380 compared with presentable sentence 390, and so on. For more information regarding a LambdaMART-based implementation, see Christopher J. C. Burges. 2010. *From RankNet to LambdaRank to LambdaMART: An Overview.*

In yet another embodiment, the extended model 516 may correspond to a bidirectional Long short-term memory (LSTM)-based model, which may employ a recurrent neural network architecture. In this embodiment, similar to as described above, the BERT-based model 510 may first output vector 512, which may then be concatenated with data corresponding to features output by engineered features generator 513 to produce extended vector 514. The extended vector 514 may then be input into the bidirectional LSTM model 516 to produce relevance score 518. In some embodiments, utilizing a bidirectional LSTM type of extended model 516 may improve the ability of the ML model 501 incorporate the context for the particular presentable sentence 370 within the overall processed answer (e.g., determined at step 306 of FIG. 3) when determining the relevance score 518 for the particular presentable sentence 370. In some embodiments, the output of the bidirectional LSTM model 516 may further be input into a Conditional Random Field (CRF) layer (not shown), which may be used to determine relationships and/or dependencies between successive presentable sentences.

Turning to the outputs of the ML model 501 in further detail, the model 501 may output a relevance score 518 for each presentable sentence. In this way, the system 120 may produce a set of relevance scores for the plurality of presentable sentences. A ranker algorithm 520 may then rank each presentable sentence based at least in part on the corresponding relevance score.

Following the ranking of presentable sentences, the system 120 may select a portion of the plurality of presentable sentences via a summary selector 522. In some embodiments, the summary selector 522 may be configured to select a single presentable sentence of the plurality of presentable sentences. The single presentable sentence may correspond to the reformulated answer. In other embodiments, multiple sentences may be selected. In these embodiments, the number of sentences selected may be determined based at least in part on a threshold value that corresponds to a maximum number of words that may be selected within a reformulated answer. For example, the summary selector 522 may be configured to select up to fifty-five words in total (e.g., the sum of words of all selected presentable sentences). The fifty-five words may be chosen, for example, based at least in part on a determination that a user 112 may only want to receive short summaries in response to questions 114. As mentioned above, in some embodiments, this threshold value may be determined based at least in part on a user preference. In other embodiments, the summary selector 522 may automatically be configured to select up to a predetermined number of words, based, for example, on the domain of the question being asked. For example, the question, "Who is the president of the United States?" may correspond to a different domain than a question such as, "How do you paint a house?" In some embodiments, the summary selector 522 may be configured to allow for a word excess allowance buffer, in case the number of words included within the portion of selected presentable sentences exceeds the threshold value by a small amount. For example, consider an example where the threshold value is fifty-five words and the word excess allowance buffer is five words. If the summary selector 522 determines three sentences of which the combined word count is fifty-six words, the selector 522 may still select all three sentences. In other embodiments, however, there may be no word excess allowance buffer, in which case, following the example above, only two sentences may be selected.

In some embodiments, the summary selector 522 may select a portion of the plurality of presentable sentences, whereby the ordering of the presentable sentences within the selected portion matches an ordering respectively corresponding to ordered contents within the pre-processed answer 310. For example, referring to block 406 of FIG. 4, the summary selector 522 may select sentences three and five (in that particular order), a selection which matches the ordering of the respectively corresponding content elements (e.g., sentences) within the original pre-processed answer (as represented in data block 402). Moreover, in some embodiments, at least two presentable sentences of the selected portion of the plurality of presentable sentences may be derived from respectively corresponding sentences within the pre-processed answer 310 that are not contiguous to each other within the pre-processed answer 310. For example, referring again to FIG. 4, the selected sentences three and five of block 406 are not contiguous to each other as represented within the respectively corresponding content elements within the pre-processed answer (see data block 402). It should be understood that one technical advantage of the present disclosure involves the ability to select presentable sentences among non-contiguous sentences within the pre-processed answer. This provides greater flexibility to the system in choosing among several candidate sentences, in contrast to existing systems which may necessitate selecting a block of contiguous sentences as a summary answer (e.g., the introductory paragraph), even though some of the individual sentences within the block of contiguous sentences may be less relevant than other sentences. Meanwhile, this additional flexibility also enables the system to provide shorter summaries with greater relevance in answering the question 114.

Finally, as introduced above, the ML model 501 and the resulting selection of presentable sentences may be trained based at least in part on training data 502 and corresponding training labels 504. The dataset of training data 502 and training labels 504 may be generated based at least in part on one or more factors. For example, in some embodiments, the dataset may be composed from data from one or more sources (e.g., CQA websites). The one or more sources may be chosen based at least in part on a particular domain of the question 114. For example, a dataset including sample questions and answers related to programming and/or computer science may be chosen from a particular CQA website. This dataset may be used to train ML model 501, specifically configured to analyze computer science/programming related questions. Accordingly, there may be different types of ML models trained for different domains of questions. In other embodiments, a dataset may span multiple domains of question types. In some embodiments, one or more aspects of the configuration of the NLP service 130 may be based at least in part on the source for the dataset. For example, if the training data 502 is retrieved from a source that typically includes shorter answers, the threshold value of the summary selector 522 may have a lower value than if the source typically includes longer answers. In some embodiments, for example, BERT-based model 510 and/or extended model 516 (e.g., MLP model), the system may determine the learning rate and the number of layers used to train the model using any suitable method (e.g., by performing a grid search on a development set portion of the corpus of training data). In some embodiments, the learning rate for the BERT-based model 510 may be different than the learning rate for the extended model 516. For example, the extended model 516 may have a higher learning rate than the BERT-based model 510 due to the need to train the extended model 516 that has not been previously trained. As discussed further below in reference to FIG. 6, the training data and respective training labels may be curated to enable training of the ML model 501.

FIG. 6 illustrates an example annotation task page for collecting training data to train a machine learning model (e.g., ML model 501) of a computer system to support an interaction session, in accordance with various embodiments. In FIG. 6, the annotation task page 600 includes four components. The first component (a) 602 presents a question (e.g., question 114) and an answer to the user (e.g., the annotator). The answer may correspond to the plurality of presentable sentences that were generated in step 306 of FIG. 3. The second component (b) 604 asks the annotator to select a single sentence that individually best answers the question. The third component (c) 606 asks the annotator if the single sentence selected answers the question clearly and independently of other sentences. The fourth component (d) 608 asks the annotator to mark all the sentences (fewer being better) that should appear in a concise and direct answer to the question. It should be understood that an underlying motivation for using each of these components is to generate a reformulated answer via an extractive summarization approach. More specifically, instead of asking an annotator to write a reference summary of the original answer from scratch (e.g., which may be used in other existing systems), the annotation task page 600 may frame each component as a sentence selection problem, asking the annotator to choose from existing sentences. In this way, the NLP service 130 (utilizing the trained ML model 501) may provide a reformulated answer 118 to the user 112 in a concise form, while preserving the meaning contained within the original answer.

Turning to each component of the annotation task page 600 in further detail, the first component (a) 602 enables the annotator to visualize the question and answer in order to answer the subsequent questions. As described above, the question and answer pairs may be chosen from one or more sources (e.g., CQA websites). In some embodiments, the question and answer pairs may be grouped by domain (e.g., History, Mathematics, Computer Science, DIY, etc.). In FIG. 600, a DIY example question and answer pair is illustrated, using the same example as depicted in FIG. 4. Specifically, component (a) 602 may correspond to the plurality of presentable sentences depicted in block 406. In some embodiments, component (a) 602 may alternatively correspond to the presentable units of block 404 (e.g., before the combining or splitting of presentable units is performed to generate presentable sentences, but with the HTML tags removed).

The second component (b) 604 and third component (c) 606 may be used to train ML model 501 by generating a first ground truth label. The first ground truth label (e.g., training label 504) may be used to train ML model 501 to select a single sentence of the plurality of presentable sentences as the reformulated answer. For example, in component (b) 604, the annotator may select the third presentable sentence as being the best choice. The annotator may also indicate in component (c) 606 that that selection answers the question clearly and independently of other sentences. Accordingly, this training data sample 502 may be used as a ground truth label for single sentence selection training. In some embodiments, if the annotator had selected "No" for component (c) 606, that particular training sample may be filtered out for training the model for single sentence selection. As described above, it should be understood that, in the case where the system 120 determines to select a single presentable sentence as the reformulated answer, the summary selector 522 may correspondingly select the highest ranked sentence output by the ML model 501. This may be used, for example, in a case where the system determines that a single-sentence answer is optimal, based in part on the domain of the query, the source from which the answer was retrieved (e.g., a particular CQA website), and/or a user preference of the user device 110.

The fourth component (d) 608 may be used to train ML model 501 by generating a second ground truth label. The second ground truth label (e.g., training label 504) may be used to train ML model 501 for the scenario when the system 120 determines to select multiple sentences of the plurality of presentable sentences as the reformulated answer. For example, in component (d) 608, the annotator may select the third and fifth presentable sentences as being the portion that answers the question clearly and independently of other sentences. Accordingly, this training label 504 may be used for multi-sentence selection training.

In some embodiments, multiple annotators may be used to generate a ground truth label for a given question and answer pair. For single sentence selection, the system may determine the ground truth label based on the most voted presentable sentence of the plurality of presentable sentences. However, particularly in the case of multi-sentence selection, each annotator may select a different combination of sentences (e.g., for component (d) 608). In this example, the system may determine a ground truth label based at least in part on a random sentence selection model, where the probability of selecting a sentence is equal to the fraction of annotators picking the sentence. Thus, for example, if a sentence is picked by two annotators out of five, the probability of picking the sentence is set to 0.4. Using this random model, the system may assign a probability score to each of the annotated summaries. The system may then select the summary with the highest likelihood as the ground truth. It should be understood that the method using a random sentence selection model for generating ground truth labels is a non-limiting example. Accordingly, the system may utilize any suitable method of determining ground truth labels 504 and corresponding training data 502 to train ML model 501.

As described above in reference to FIG. 5, in some embodiments, training data 502 and ground truth labels 504 may be used to train both the baseline model 510 and the extended model 516. For example, the pre-trained BERT-based model 510 may be further trained (e.g., fine-tuned) based at least in part on training data 502 and training labels 504. Additionally, the extended 516 model may be trained based at least in part on the extended vector 514 and the training labels 504. As discussed above, the extended vector 514 may be generated based at least in part on engineered features that are output from the engineered features generator 513, which may in turn generate the engineered features based at least in part on the training data 502 (e.g., the question and answer pairing, as discussed above). In some embodiments, the training of the supervised ML models (e.g., BERT-based model and/or extended model) may be performed based at least in part on a loss function. For example, the loss function may be computed based at least in part on a comparison between the ground truth label (e.g., whether a presentable sentence(s) was picked by the annotators) and the system prediction (e.g., whether the presentable sentence(s) was picked by the summary selector 522, according to the ranking of the relevance scores output by ML model 501). Based at least in part on the output of the loss function, the ML model 501 may be trained to minimize the output.

Figure 7:
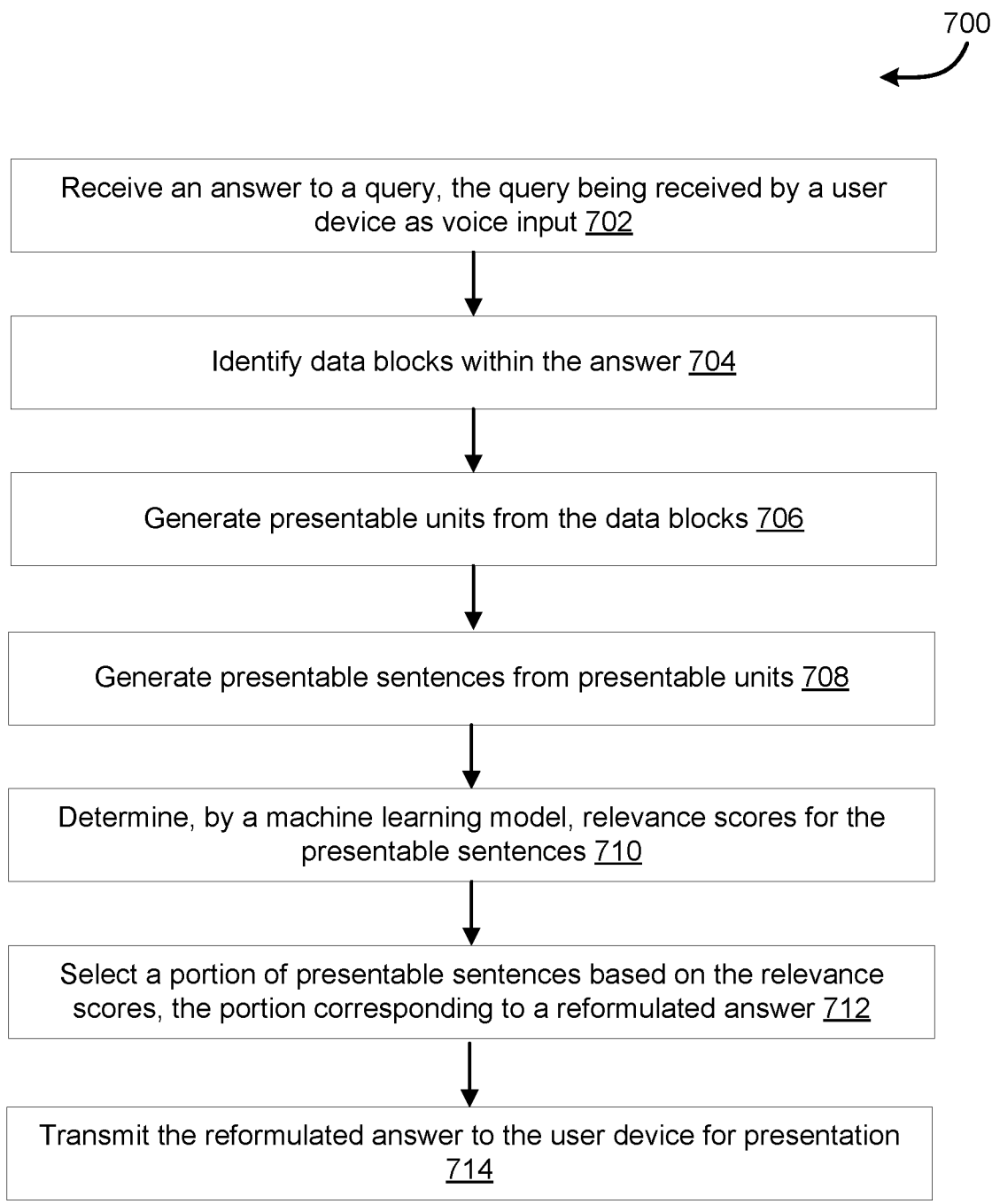
FIG. 7 illustrates an example flow for processing user interactions in an interaction session, in accordance with various embodiments.

FIG. 7 illustrates an example flow for processing user interactions in an interaction session, in accordance with various embodiments. In particular, FIG. 7 describes the system performing phase one and phase two to generate a reformulated answer from a pre-processed answer, and then transmitting the reformulated answer to a user device for presentation on a voice-based interface. Some or all of the process 700 (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The example flow may start at operation 702, where the system 120 may receive an answer to a query 114, the query 114 being received by a user device 110 as voice input. In some embodiments, operation 702 may include steps that are similar to steps performed by the answer determination module 214 of FIG. 2 and further illustrated by step 303 of FIG. 3. Specifically, the computer system 120 may determine a chosen answer from a source (e.g., a CQA website). The chosen answer may be initially formatted in HTML (or other suitable format), and may correspond to the pre-processed answer 310 of FIG. 3 and/or data block 402 of FIG. 4.

At operation 704, the system 120 may identify data blocks within the answer 310. In some embodiments, operation 704 may include steps that are similar to steps performed within step 304 of FIG. 3. For example, the system may determine, based at least in part on one or more tags within the pre-processed answer 310, a plurality of data blocks. Each data block may correspond to an HTML element and include a content element and a metadata element. The tags may correspond to HTML tags, and a tag of the one or more tags may be associated with a particular data block of the plurality of data blocks. Additionally, the content element and the metadata element of the particular data block may respectively correspond to a content and a markup of the HTML element, the tag being used to identify the markup of the HTML element. It should be understood that data blocks may be nested within other data blocks (e.g., just as HTML elements may be nested within other HTML elements).

At operation 706, the system 120 may generate presentable units from the data blocks that were identified at operation 704. In some embodiments, operation 706 may include steps that are similar to steps performed within step 304 of FIG. 3 and illustrated in block 404 of FIG. 4. For example, upon determining a non-presentable component within a particular data block (e.g., HTML element), the system may substitute a presentable component for the non-presentable component. In some embodiments, the entire HTML element may be removed, such as in the case of an image element. As mentioned above, some non-presentable components (e.g., images, videos) may be saved for later retrieval and presentation on another device that has a visual interface (e.g., phone device 240). In some embodiments, instead of removing the entire HTML element, a portion of the content of the HTML element may be removed or replaced with a presentable component. For example, in the case of a special marker (e.g., "=>", which may translate to "implies"), the system may replace the special marker within the text of the HTML element with the word "implies."

At operation 708, the system 120 may generate presentable sentences from the presentable units that were generated at operation 706. In some embodiments, operation 708 may include steps that are similar to steps performed within step 306 of FIG. 3 and illustrated in block 406 of FIG. 4. For example, the system may combine or split presentable units, based in part on the metadata element and/or the content element of the respectively associated data blocks for each presentable unit. In an example, and as described above, the system may combine two presentable units if a colon is identified within the content element, the colon indicating that two units are logically connected. In another example, the system may combine two presentable units if the metadata elements associated with each presentable unit indicate that the presentable units are part of a list (e.g., sorted or unsorted list). In yet another example, the system may split text within a single presentable unit if the number of words exceeds a certain threshold (e.g., twenty-five words). It should be understood that the system may determine whether to combine or split presentable units to form presentable sentences utilizing any suitable method. The resulting plurality of presentable sentences may form a processed answer.

At operation 710, the system may determine, by a machine learning model, relevance scores for the presentable sentences that were generated at operation 708. In some embodiments, the machine learning model may correspond to a trained ML model 501 as described in reference to FIG. 5. The ML model 501 may be configured to generate a relevance score 518 for each presentable sentence of the plurality of presentable sentences that form the processed answer.

At operation 712, the system may select a portion of presentable sentences based at least in part on the relevance scores, the portion corresponding to a reformulated answer. In some embodiments, operation 712 may include steps that are similar to steps performed within step 308 of FIG. 3. These steps are further described in reference to FIG. 5. For example, the ranker 520 may select the portion of presentable sentences of the processed answer based at least in part on ranking the set of relevance scores. Then, the summary selector 522 may select the portion based at least on the ranking. In some embodiments, the summary selector 522 may also select the portion based at least in part on a configuration. In an example, the configuration may configure the selector 522 to select a single best sentence from the processed answer. In another example, the configuration may configure the selector 522 to select multiple sentences from the processed answer. In the case where multiple sentences may be selected, the selection may be performed according to a predetermined threshold value. The predetermined threshold value may correspond to a maximum number of words presentable via the voice-based interface of the user device 110. It should be understood that the ML model 501 and/or other system components involved in selecting the portion of presentable sentences (e.g., summary selector 522) may be trained/configured based at least in part on a domain of the question (e.g., the type of question), the source of the answer to the question (e.g., a particular CQA website), and/or a preference of the user 112 of the user device 110. The resulting portion of the plurality of presentable sentences may correspond to a reformulated answer.

At operation 714, the system may transmit the reformulated answer to the user device for presentation. In some embodiments, operation 714 may be performed in part by the text-to-speech module 222 of FIG. 2, and may be further illustrated in FIG. 1. Specifically, the text-to-speech module 222 may convert the reformulated answer 395 to audio data 116, which may then be transmitted within a message by the system 120 to the user device 110. The user device 110 may then output the reformulated answer 118 on the user device (e.g., via a voice-based interface, such as a speaker). As described above, the system 120 may also include within the message an instruction that instructs the user 112 to retrieve non-presentable components for presentation on another user device (e.g., phone device 240). The message may also provide an instruction that alerts the user 112 that the user device 112 may output the entire processed answer upon request by the user 112.

Figure 8:
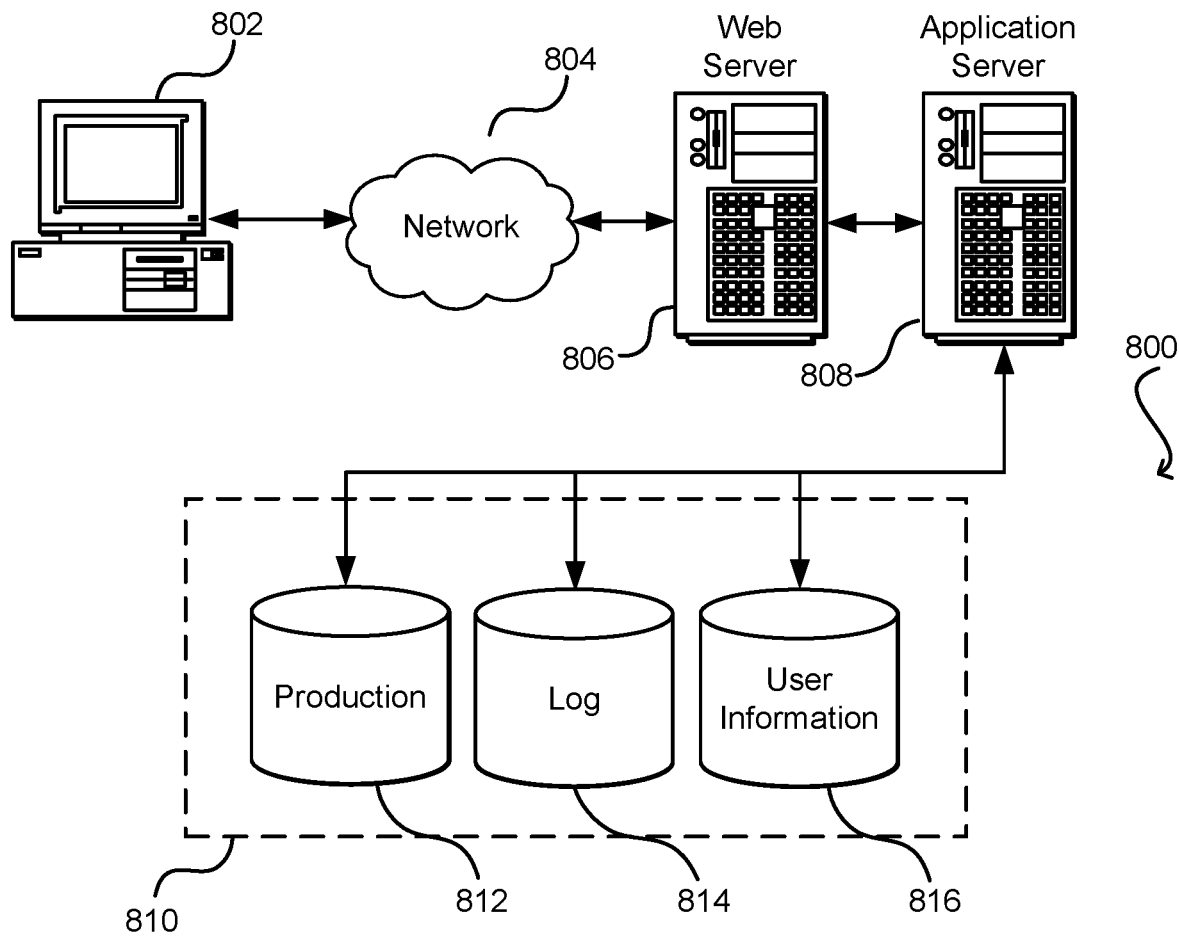
FIG. 8 illustrates an environment in which various embodiments can be implemented.

FIG. 8 illustrates aspects of an example environment 800 for implementing aspects in accordance with various embodiments. As will be appreciated, although a Web-based environment is used for purposes of explanation, different environments may be used, as appropriate, to implement various embodiments. The environment includes an electronic client device 802, which can include any appropriate device operable to send and receive requests, messages, or information over an appropriate network 804 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 802 and the application server 808, can be handled by the Web server. It should be understood that the Web and application servers are not required and are merely example components, as structured code discussed herein can be executed on any appropriate device or host machine as discussed elsewhere herein.

The data store 810 can include several separate data tables, databases or other data storage mechanisms and media for storing data relating to a particular aspect. For example, the data store illustrated includes mechanisms for storing production data 812 and user information 816, which can be used to serve content for the production side. The data store also is shown to include a mechanism for storing log data 814, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 802. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C #, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A system, comprising:
    one or more processors and one or more computer-readable storage media storing instructions that, upon execution by the one or more processors, cause the system to, at least:
        receive, from a user device, a query, the user device being configured to receive the query as voice input;
        receive, at least in response to receipt of the query, an answer to the query;
        identify, based at least in part on one or more tags within the answer, a plurality of data blocks, a data block of the plurality of data blocks comprising a content element and a metadata element, at least one of the content element or the metadata element comprising a non-presentable component that is not presentable via a voice-based interface of the user device;

generate a presentable unit for at least one data block of the plurality of data blocks, the presentable unit determined based at least in part on substituting the non-presentable component with a presentable component that is presentable via the voice-based interface of the user device;

generate a plurality of presentable sentences from a plurality of presentable units and based at least in part on the metadata element or the content element of respectively associated data blocks of the plurality of data blocks, the plurality of presentable sentences forming a processed answer;

determine a relevance score for a presentable sentence of the plurality of presentable sentences based at least in part on processing the query and the processed answer with a machine learning model, the relevance score being of a set of relevance scores and corresponding to a measure of relevance with respect to the presentable sentence answering the query;

select a portion of the plurality of presentable sentences that form the processed answer based at least in part on a ranking of the set of relevance scores, the portion corresponding to a reformulated answer; and transmit, to the user device, a message comprising the reformulated answer that enables the voice-based interface of the user device to present the reformulated answer.

2. The system of claim 1, wherein the one or more tags are Hypertext Markup Language (HTML) tags, a tag of the one or more tags being associated with a particular data block of the plurality of data blocks, the particular data block corresponding to a Hypertext Markup Language element, the content element and the metadata element of the particular data block respectively corresponding to a content and a markup of the Hypertext Markup Language element, and the tag being used to identify the markup of the Hypertext Markup Language element.

3. The system of claim 1, wherein the presentable unit of the plurality of presentable units is generated by substituting a plurality of non-presentable components of the associated data block, respectively, with corresponding presentable components.

4. The system of claim 3, wherein a type of non-presentable component comprises a tag of the one or more tags, the metadata element, and a non-presentable content element, the non-presentable content element comprising an image, a Uniform Resource Locator (URL), a phoneme, computer code, text in parentheses, a pictorial representation using characters, or a mathematical function.

5. The system of claim 1, wherein the system comprises a natural language processing (NLP) service, the natural language processing service further comprising the machine learning model.

6. A method implemented on a computing device, the method comprising:
receiving, by the computing device, an answer to a query, the answer comprising a content element and a metadata element, at least one of the content element or the metadata element comprising a non-presentable component that is not presentable via a voice-based interface of a user device;

generating, by the computing device, a presentable sentence based at least in part on substituting the non-presentable component with a presentable component that is presentable via the voice-based interface of the user device;

determining, by the computing device, a relevance score for the presentable sentence of a plurality of presentable sentences based at least in part on processing the query and the presentable sentence utilizing a machine learning model, the relevance score being of a set of relevance scores and corresponding to a measure of relevance with respect to the presentable sentence answering the query;

selecting, by the computing device, a portion of the plurality of presentable sentences based at least in part on a ranking of the set of relevance scores, the portion forming a reformulated answer; and transmitting, by the computing device to the user device, a message comprising the reformulated answer that enables the voice-based interface of the user device to present the reformulated answer.

7. The method of claim 6, wherein the answer comprises one or more Hypertext Markup Language (HTML) tags, a tag of the one or more tags being associated with a data block of a plurality of data blocks that comprise the answer, the data block corresponding to a Hypertext Markup Language element, the content element and the metadata element being associated with the data block and respectively corresponding to a content and a markup of the Hypertext Markup Language element, and the tag being used to identify the markup of the Hypertext Markup Language element.

8. The method of claim 7, further comprising generating the presentable sentence by at least:
generating, by the computing device, a presentable unit derived from the data block of the plurality of data blocks, the presentable unit determined based at least in part on at least one of the metadata element or the content element, the presentable unit being presentable on the voice-based interface of the user device, and the presentable unit being one of a plurality of presentable units; and generating, by the computing device, the presentable sentence of the plurality of presentable sentences based at least in part on combining or splitting one or more presentable units of the plurality of presentable units, the combining or splitting based at least in part on an aspect of the metadata element or the content element of the data block, the aspect comprising a colon or a list type of tag.

9. The method of claim 8, wherein the presentable unit of the plurality of presentable units is generated by substituting a plurality of non-presentable components of the associated data block, respectively, with corresponding presentable components.

10. The method of claim 9, wherein a type of non-presentable component comprises a tag of the one or more tags, the metadata element, and a non-presentable content element, the non-presentable content element comprising an image, a Uniform Resource Locator (URL), a phoneme, computer code, text in parentheses, a pictorial representation using characters, or a mathematical function.

11. The method of claim 6, wherein the computing device comprises the machine learning model, the machine learning model being a supervised model that utilizes a neural network.

12. The method of claim 11, further comprising determining the relevance score by at least:

receiving, by the machine learning model, the presentable sentence and the query;

outputting, by the machine learning model, an output token, based at least in part on the presentable sentence and the query;

generating a vector based at least in part on the output token and one or more features, the vector being input into the machine learning model; and outputting, by the machine learning model, the relevance score.

13. The method of claim 12, wherein the one or more features correspond to at least one of: 1) a position of the presentable sentence within the answer, 2) a determination of a similarity between the presentable sentence and the query, 3) lexical characteristics of the presentable sentence, or 4) structural characteristics of the presentable sentence.

14. The method of claim 6, further comprising selecting the portion of the plurality of presentable sentences by at least:

receiving, by the computing device, a threshold value that corresponds to a maximum number of words presentable via the voice-based interface of the user device; and selecting, by the computing device, based at least in part on the threshold value, the portion of the plurality of presentable sentences forming the reformulated answer.

15. The method of claim 6, wherein a first ordering of presentable sentences within the portion of the plurality of presentable sentences matches a second ordering of respectively corresponding ordered contents within the answer.

16. The method of claim 6, wherein the answer is retrieved from a Community Question Answering (CQA) website, the Community Question Answering website including a plurality of answers to another query, the query being previously determined to be similar to the another query, and the answer selected among the plurality of answers as being a chosen match.

17. A non-transitory computer-readable storage medium storing instructions that, upon execution on a computing device, configure the computing device to perform operations comprising:

receiving an answer to a query, the answer comprising a content element and a metadata element, at least one of the content element or the metadata element comprising a non-presentable component that is not presentable via a voice-based interface of a user device;

generating a presentable sentence based at least in part on substituting the non-presentable component with a presentable component that is presentable via the voice-based interface of the user device;

determining a relevance score for the presentable sentence of a plurality of presentable sentences based at least in part on processing the query and the presentable sentence within a machine learning model, the relevance score being of a set of relevance scores and corresponding to a measure of relevance with respect to the presentable sentence answering the query;

selecting a portion of the plurality of presentable sentences based at least in part on a ranking of the set of relevance scores, the portion forming a reformulated answer; and transmitting to the user device a message comprising the reformulated answer that enables the voice-based interface of the user device to present the reformulated answer.

18. The non-transitory computer-readable storage medium of claim 17, wherein at least two presentable sentences of the portion of the plurality of presentable sentences are derived from respectively corresponding content elements of the answer that are not contiguous to each other within the answer.

19. The non-transitory computer-readable storage medium of claim 17, wherein the reformulated answer is generated based at least in part on data indicative of a source of the reformulated answer, a preference of a user of the user device, or a domain of the query.

20. The non-transitory computer-readable storage medium of claim 17, wherein the operations further comprise:

determining a non-presentable component derived from the answer; and including within the message an instruction that instructs a user of the user device that the user may retrieve the non-presentable component for presentation on another device, wherein the instruction is presentable on the voice-based interface of the user device along with the reformulated answer.

* * * * *